(12) United States Patent
Petro et al.

(10) Patent No.: US 8,283,832 B2
(45) Date of Patent: Oct. 9, 2012

(54) SCULPTED FIELD POLE MEMBERS AND METHODS OF FORMING THE SAME FOR ELECTRODYNAMIC MACHINES

(75) Inventors: John Patrick Petro, Los Altos, CA (US); Ken George Wasson, Foster City, CA (US); Jeremy Franz Mayer, Santa Clara, CA (US)

(73) Assignee: NovaTorque, Inc., Fremont, CA (US)

(*) Notice: Subject to any disclaimer, the term of this patent is extended or adjusted under 35 U.S.C. 154(b) by 398 days.

(21) Appl. No.: 11/707,817

(22) Filed: Feb. 12, 2007

(65) Prior Publication Data

US 2007/0205675 A1 Sep. 6, 2007

Related U.S. Application Data

(63) Continuation-in-part of application No. 11/255,404, filed on Oct. 20, 2005, now Pat. No. 7,294,948.

(60) Provisional application No. 60/622,258, filed on Oct. 25, 2004, provisional application No. 60/773,500, filed on Feb. 14, 2006.

(51) Int. Cl.
*H02K 19/06* (2006.01)
*H02K 19/00* (2006.01)
*H02K 19/08* (2006.01)

(52) U.S. Cl. ......... 310/254.1; 310/154.38; 310/216.023; 310/216.039

(58) Field of Classification Search ............... 310/264, 310/154.35, 154.38, 266, 268, 216.023, 216.039, 310/114, 254.1; *H02K 19/00, 19/06, 19/08*
See application file for complete search history.

(56) References Cited

U.S. PATENT DOCUMENTS

| | | | |
|---|---|---|---|
| 414,659 A | 11/1889 | Seafert |
| 422,862 A | 3/1890 | Washburn |
| 439,102 A | 10/1890 | Bradley |
| 754,066 A | 3/1904 | Hoffman |
| 829,975 A | 9/1906 | Lincoln |
| 846,079 A | 3/1907 | Yost |
| 1,039,197 A | 9/1912 | Roth |

(Continued)

FOREIGN PATENT DOCUMENTS

CH 400323 4/1966

(Continued)

OTHER PUBLICATIONS

"Forming." Dictionary.com Unabridged. Random House, Inc. Sep. 20, 2010. <Dictionary.com http://dictionary.reference.com/browse/forming>.*

(Continued)

*Primary Examiner* — Quyen Leung
*Assistant Examiner* — Michael Andrews
(74) *Attorney, Agent, or Firm* — Kokka & Backus, PC

(57) ABSTRACT

A method, apparatus, article of manufacture and system for producing a field pole member for electrodynamic machinery are disclosed to, among other things, reduce magnetic flux path lengths and to eliminate back-iron for increasing torque and/or efficiency per unit size (or unit weight) and for reducing manufacturing costs. For example, a field pole member structure can either reduce the length of magnetic flux paths or substantially straighten those paths through the field pole members, or both. In one embodiment, a method provides for the construction of field pole members for electrodynamic machines.

15 Claims, 18 Drawing Sheets

U.S. PATENT DOCUMENTS

| | | | |
|---|---|---|---|
| 1,557,213 A | 10/1925 | Lee | |
| 1,640,742 A | 8/1927 | Wallace | |
| 1,763,104 A | 6/1930 | Shurtleff | |
| 1,771,281 A | 7/1930 | Wilsing | |
| 1,874,094 A | 8/1932 | Ford | |
| 1,962,832 A | 6/1934 | Neureuther | |
| 2,025,560 A * | 12/1935 | Warren | 310/163 |
| 2,059,518 A | 11/1936 | Harley | |
| 2,081,993 A | 6/1937 | Gebhardt | |
| 2,141,681 A | 12/1938 | Brueck | |
| 2,378,668 A | 6/1945 | Vickers | |
| 2,480,825 A | 9/1949 | Adolph | |
| 2,484,001 A | 10/1949 | Raymond | |
| 2,486,656 A | 11/1949 | Klinkhamer | |
| 2,500,730 A | 3/1950 | Yonkers | |
| 2,513,226 A | 6/1950 | Wylie | |
| 2,513,227 A | 6/1950 | Wylie | |
| 2,561,890 A | 7/1951 | Stoddard | |
| 2,575,153 A | 11/1951 | Wightman | |
| 2,669,687 A | 2/1954 | De Tastes | |
| 2,677,256 A | 5/1954 | Donandt | |
| 2,677,259 A | 5/1954 | Woodward | |
| 2,694,781 A | 11/1954 | Hinz | |
| 2,717,969 A | 9/1955 | Buchhold | |
| 2,769,106 A | 10/1956 | Dembowski | |
| 2,796,542 A | 6/1957 | Bekey | |
| 2,802,959 A | 8/1957 | Powers | |
| 2,824,272 A | 2/1958 | Delaporte | |
| 2,927,229 A | 3/1960 | Merrill | |
| 3,001,093 A | 9/1961 | Wilcox | |
| 3,025,445 A | 3/1962 | Welch | |
| 3,083,310 A | 3/1963 | Tweedy | |
| 3,111,596 A | 11/1963 | Lovegrove | |
| 3,153,157 A | 10/1964 | Rabe | |
| 3,173,042 A | 3/1965 | Fodor | |
| 3,175,111 A | 3/1965 | Orr | |
| 3,205,384 A | 9/1965 | Sears | |
| 3,210,582 A | 10/1965 | Miller | |
| 3,223,866 A | 12/1965 | Tiltins | |
| 3,241,111 A | 3/1966 | Sandstrom | |
| 3,241,304 A | 3/1966 | Mattingly | |
| 3,277,324 A | 10/1966 | Beauddin et al. | |
| 3,309,547 A | 3/1967 | Woodward | |
| 3,319,100 A | 5/1967 | Erickson | |
| 3,321,652 A | 5/1967 | Opel | |
| 3,344,325 A | 9/1967 | Sklaroff | |
| 3,356,425 A | 12/1967 | Carrierre | |
| 3,360,667 A | 12/1967 | Gordon | |
| 3,374,376 A | 3/1968 | Kromrey | |
| 3,396,291 A | 8/1968 | Somerville | |
| 3,399,002 A | 8/1968 | Atkinson | |
| 3,428,837 A | 2/1969 | Morreale | |
| 3,466,518 A | 9/1969 | Aylikci | |
| 3,471,729 A | 10/1969 | Latta | |
| 3,482,131 A | 12/1969 | Lytle | |
| 3,490,816 A | 1/1970 | Lyman | |
| 3,513,341 A | 5/1970 | Gratzmuller | |
| 3,519,859 A | 7/1970 | Morreale | |
| 3,529,191 A | 9/1970 | Henry-Baudot | |
| 3,555,324 A | 1/1971 | Lovegrove | |
| 3,565,495 A | 2/1971 | Lyman | |
| 3,603,826 A | 9/1971 | Saretzky | |
| 3,619,014 A | 11/1971 | Quick | |
| 3,628,239 A | 12/1971 | Hunt et al. | |
| 3,648,090 A | 3/1972 | Voin | |
| 3,651,355 A * | 3/1972 | Mason | 310/112 |
| 3,663,851 A | 5/1972 | Persson | |
| 3,689,787 A | 9/1972 | Saretzky | |
| 3,717,780 A | 2/1973 | Hohne | |
| 3,723,796 A | 3/1973 | Mason | |
| 3,787,100 A * | 1/1974 | Habermann et al. | 310/90.5 |
| 3,819,964 A | 6/1974 | Noodleman | |
| 3,822,768 A | 7/1974 | Sebulke | |
| 3,836,802 A | 9/1974 | Parker | |
| 3,863,084 A | 1/1975 | Hasebe | |
| 3,876,892 A | 4/1975 | Noodleman | |
| 3,892,987 A | 7/1975 | Noodleman | |
| 3,936,680 A | 2/1976 | Kuwako | |
| 3,937,993 A | 2/1976 | Noodleman | |
| 3,947,155 A * | 3/1976 | Bidol | 310/27 |
| 3,950,663 A | 4/1976 | Mead | |
| 3,956,651 A | 5/1976 | Brammerlo | |
| 3,979,821 A | 9/1976 | Noodleman | |
| 3,991,331 A | 11/1976 | Noodleman | |
| 4,031,421 A | 6/1977 | Geiger | |
| 4,043,614 A | 8/1977 | Lyman | |
| 4,045,696 A * | 8/1977 | Lutz et al. | 310/49.43 |
| 4,047,807 A | 9/1977 | Okano | |
| 4,066,922 A | 1/1978 | Hennemann | |
| 4,072,881 A | 2/1978 | Ban | |
| 4,080,724 A * | 3/1978 | Gillette | 310/216.008 |
| 4,117,359 A | 9/1978 | Wehde | |
| 4,143,289 A | 3/1979 | Williams | |
| 4,152,570 A | 5/1979 | Inoue | |
| 4,156,817 A | 5/1979 | Preece | |
| 4,159,434 A | 6/1979 | Kalsi | |
| D256,351 S | 8/1980 | Schulze | |
| 4,216,263 A * | 8/1980 | Otis et al. | 428/383 |
| 4,221,984 A | 9/1980 | Mason | |
| 4,225,798 A | 9/1980 | Barrett | |
| 4,259,603 A | 3/1981 | Uchiyama | |
| 4,310,768 A | 1/1982 | Colley | |
| 4,321,495 A | 3/1982 | Kennedy | |
| 4,327,302 A | 4/1982 | Hershberger | |
| 4,328,411 A | 5/1982 | Haller | |
| 4,358,693 A | 11/1982 | Palmer | |
| 4,363,988 A | 12/1982 | Kliman | |
| 4,378,146 A | 3/1983 | Suzuki | |
| 4,390,262 A | 6/1983 | Hirohata | |
| 4,395,815 A | 8/1983 | Stanley | |
| 4,460,253 A | 7/1984 | Kawai et al. | |
| 4,476,395 A | 10/1984 | Cronin | |
| 4,480,208 A | 10/1984 | Logie | |
| 4,483,570 A | 11/1984 | Inoue | |
| 4,491,401 A | 1/1985 | Inaba | |
| 4,503,349 A | 3/1985 | Miller | |
| 4,543,506 A | 9/1985 | Kawada et al. | |
| 4,564,775 A | 1/1986 | Mazzorana | |
| 4,577,129 A | 3/1986 | Bertram | |
| 4,593,222 A | 6/1986 | Burkel | |
| 4,594,539 A | 6/1986 | Michelson | |
| 4,601,564 A | 7/1986 | Yamamoto | |
| 4,614,888 A | 9/1986 | Mosher et al. | |
| 4,628,220 A | 12/1986 | Flogvall | |
| 4,631,807 A | 12/1986 | Kawada et al. | |
| 4,658,228 A | 4/1987 | Leupold | |
| 4,663,581 A | 5/1987 | Glennon | |
| 4,674,178 A | 6/1987 | Patel | |
| 4,713,569 A | 12/1987 | Schwartz | |
| 4,725,750 A | 2/1988 | Welch | |
| 4,731,626 A | 3/1988 | Kawamoto | |
| 4,734,604 A | 3/1988 | Sontheimer | |
| 4,741,094 A | 5/1988 | Denk et al. | |
| 4,745,345 A | 5/1988 | Petersen | |
| 4,748,359 A | 5/1988 | Yahara | |
| 4,748,361 A | 5/1988 | Ohnishi et al. | |
| 4,757,224 A | 7/1988 | McGee | |
| 4,759,186 A | 7/1988 | Sugden | |
| 4,760,314 A | 7/1988 | Mohri et al. | |
| 4,763,150 A | 8/1988 | Sumi | |
| 4,777,397 A | 10/1988 | Parshall | |
| 4,788,369 A | 11/1988 | Marsh | |
| 4,788,465 A | 11/1988 | Hertrich | |
| 4,802,347 A | 2/1989 | Nystuen | |
| 4,879,484 A | 11/1989 | Huss | |
| 4,883,996 A | 11/1989 | Aoki | |
| 4,885,489 A | 12/1989 | Stuhr | |
| 4,918,802 A | 4/1990 | Schaefer | |
| 4,920,295 A | 4/1990 | Holden | |
| 4,939,397 A | 7/1990 | Morrill | |
| 4,949,000 A | 8/1990 | Petersen | |
| 4,962,583 A | 10/1990 | Yang | |
| 4,983,870 A | 1/1991 | McSparran | |
| 4,984,972 A | 1/1991 | Clausen | |
| 5,033,265 A | 7/1991 | Sugden | |
| 5,036,235 A | 7/1991 | Kleckner | |
| 5,045,741 A | 9/1991 | Dvorsky | |

| | | |
|---|---|---|
| 5,047,682 A | 9/1991 | Burgbacher |
| 5,049,771 A | 9/1991 | Challita et al. |
| 5,081,387 A | 1/1992 | Nystuen |
| 5,091,668 A | 2/1992 | Cuenot et al. |
| 5,130,592 A | 7/1992 | Bitsch |
| 5,140,211 A | 8/1992 | Ucida |
| 5,140,212 A | 8/1992 | Iwasaki |
| 5,157,297 A | 10/1992 | Uchida |
| 5,168,187 A | 12/1992 | Baer et al. |
| 5,191,256 A | 3/1993 | Reiter, Jr. et al. |
| 5,200,662 A | 4/1993 | Tagami et al. |
| 5,204,572 A | 4/1993 | Ferreira |
| 5,212,418 A | 5/1993 | Mason |
| 5,216,308 A | 6/1993 | Meeks |
| 5,233,254 A | 8/1993 | Fisher et al. |
| 5,237,229 A | 8/1993 | Ohishi |
| 5,258,677 A | 11/1993 | Mason |
| 5,283,492 A | 2/1994 | Mason |
| 5,300,848 A | 4/1994 | Huss |
| 5,386,161 A | 1/1995 | Sakamoto |
| 5,406,157 A | 4/1995 | New |
| 5,436,518 A | 7/1995 | Kawai |
| 5,463,262 A | 10/1995 | Uchida |
| 5,486,730 A | 1/1996 | Ludwig |
| 5,514,924 A | 5/1996 | McMullen |
| 5,536,985 A | 7/1996 | Ward et al. |
| 5,610,460 A | 3/1997 | Jacobson |
| 5,627,419 A | 5/1997 | Miller |
| 5,642,009 A | 6/1997 | McCleer et al. |
| 5,656,880 A | 8/1997 | Clark |
| 5,659,217 A | 8/1997 | Petersen |
| 5,674,169 A | 10/1997 | Yang |
| 5,731,641 A | 3/1998 | Botos et al. |
| 5,744,887 A | 4/1998 | Itoh |
| 5,751,086 A | 5/1998 | Taghezout |
| 5,753,989 A | 5/1998 | Syverson et al. |
| 5,767,597 A | 6/1998 | Gondhalekar |
| 5,777,421 A | 7/1998 | Woodward, Jr. |
| 5,780,950 A | 7/1998 | Yang |
| 5,789,841 A | 8/1998 | Wang |
| 5,844,345 A | 12/1998 | Hsu |
| 5,955,806 A | 9/1999 | Devenyi |
| 5,955,811 A | 9/1999 | Chiba et al. |
| 5,962,948 A | 10/1999 | Hakala |
| 6,013,693 A | 1/2000 | Takahashi |
| 6,025,769 A | 2/2000 | Chu |
| 6,049,148 A | 4/2000 | Nichols |
| 6,057,613 A | 5/2000 | Trago |
| 6,104,115 A | 8/2000 | Offringa |
| 6,114,788 A | 9/2000 | Vuillemin (Muller) et al. |
| 6,157,109 A | 12/2000 | Schiferl |
| 6,177,746 B1 | 1/2001 | Tupper et al. |
| 6,188,159 B1 * | 2/2001 | Fan .................. 310/216.037 |
| 6,194,797 B1 | 2/2001 | Simon et al. |
| 6,236,124 B1 * | 5/2001 | Sekiyama et al. ......... 310/12.24 |
| 6,246,146 B1 | 6/2001 | Schiller |
| 6,346,755 B1 | 2/2002 | Tong |
| 6,359,357 B1 | 3/2002 | Blumenstock |
| 6,417,596 B1 | 7/2002 | Schurter et al. |
| 6,437,474 B1 | 8/2002 | Chu |
| 6,455,975 B1 | 9/2002 | Raad et al. |
| 6,492,751 B1 * | 12/2002 | Ineson et al. ................ 310/71 |
| 6,492,753 B2 | 12/2002 | Zepp et al. |
| 6,590,312 B1 | 7/2003 | Seguchi et al. |
| 6,700,280 B1 | 3/2004 | Geiger |
| 6,707,209 B2 | 3/2004 | Crapo et al. |
| 6,707,221 B2 | 3/2004 | Carl |
| 6,707,224 B1 | 3/2004 | Petersen |
| 6,720,688 B1 | 4/2004 | Schiller |
| 6,745,972 B2 | 6/2004 | Takano et al. |
| 6,784,582 B1 | 8/2004 | Kolomeitsev et al. |
| 6,836,388 B2 | 12/2004 | Nishimura et al. |
| 6,844,656 B1 | 1/2005 | Larsen et al. |
| 6,889,419 B2 | 5/2005 | Reiter, Jr. et al. |
| 6,897,596 B2 | 5/2005 | Laing |
| 6,903,471 B2 | 6/2005 | Arimitsu et al. |
| 6,952,064 B2 | 10/2005 | Hiwaki et al. |
| 7,061,152 B2 | 6/2006 | Petro et al. |
| 7,105,974 B2 | 9/2006 | Nashiki |
| 7,135,800 B2 | 11/2006 | Yamada et al. |
| 7,205,693 B2 | 4/2007 | Petro et al. |
| 7,239,058 B2 | 7/2007 | Petro et al. |
| 7,294,948 B2 | 11/2007 | Wasson et al. |
| 7,474,027 B2 | 1/2009 | Kikuchi et al. |
| 7,719,159 B2 | 5/2010 | Petro et al. |
| 7,884,522 B1 | 2/2011 | Petro et al. |
| 7,982,350 B2 | 7/2011 | Burch et al. |
| 7,982,352 B2 | 7/2011 | Nymann et al. |
| 8,072,106 B2 | 12/2011 | Petro et al. |
| 8,072,115 B2 | 12/2011 | Burch et al. |
| 2002/0047426 A1 | 4/2002 | Pop, Sr. |
| 2002/0192103 A1 | 12/2002 | Barber et al. |
| 2003/0051614 A1 | 3/2003 | Knoth et al. |
| 2003/0062792 A1 | 4/2003 | Reiter, Jr. et al. |
| 2003/0067236 A1 | 4/2003 | Takahata et al. |
| 2003/0214194 A1 | 11/2003 | Carl, Jr. et al. |
| 2004/0004407 A1 | 1/2004 | Laurent et al. |
| 2004/0119371 A1 | 6/2004 | Laing |
| 2004/0232800 A1 | 11/2004 | Seguchi et al. |
| 2005/0017591 A1 | 1/2005 | Brewster et al. |
| 2005/0088052 A1 * | 4/2005 | Ionel et al. ................ 310/156.09 |
| 2005/0264118 A1 | 12/2005 | Kascak et al. |
| 2006/0001328 A1 | 1/2006 | Rau et al. |
| 2006/0028093 A1 | 2/2006 | Minagawa et al. |
| 2006/0131976 A1 | 6/2006 | Kikuchi et al. |
| 2006/0152099 A1 | 7/2006 | Petro et al. |
| 2006/0238053 A1 | 10/2006 | Kascak et al. |
| 2007/0205675 A1 | 9/2007 | Petro et al. |

FOREIGN PATENT DOCUMENTS

| | | |
|---|---|---|
| DE | 2433809 A1 | 7/1974 |
| DE | 2433809 | 2/1978 |
| DE | 3742502 A1 | 12/1987 |
| DE | 37 42 502 A1 | 6/1989 |
| DE | 4223836 A1 | 1/1994 |
| DE | 19545680 A1 | 12/1995 |
| DE | 199 54 196 A1 | 6/2000 |
| DE | 101 40 362 A1 | 3/2003 |
| EP | 0162927 A1 | 12/1985 |
| EP | 0208124 A2 | 1/1987 |
| EP | 0208124 A2 | 1/1987 |
| EP | 0251350 A2 | 1/1988 |
| EP | 0251350 A2 | 1/1988 |
| EP | 0627805 A2 | 12/1994 |
| GB | 960879 | 6/1964 |
| JP | 60-66658 | 4/1985 |
| JP | 60066658 | 4/1985 |
| JP | 61189142 | 8/1986 |
| JP | 63069442 | 3/1988 |
| JP | 61-289889 | 7/1988 |
| JP | 63-171145 | 7/1988 |
| JP | 64-50403 | 2/1989 |
| JP | 04-026350 | 1/1992 |
| JP | 4-16841 | 6/1992 |
| JP | 05-062179 | 8/1993 |
| JP | 06-014521 | 1/1994 |
| JP | 06-038415 | 2/1994 |
| JP | 06-141527 | 5/1994 |
| JP | 06-351212 | 12/1994 |
| JP | 6-511132 | 12/1994 |
| JP | 07-203643 A | 8/1995 |
| JP | 08-33245 | 2/1996 |
| JP | 08-080019 | 3/1996 |
| JP | 08-223832 A | 8/1996 |
| JP | 10-174395 | 6/1998 |
| JP | 10-174399 | 6/1998 |
| JP | 10-174400 | 6/1998 |
| JP | 2000-152534 A | 5/2000 |
| JP | 11-222025 | 6/2000 |
| JP | 2000-166131 | 6/2000 |
| JP | 2001-037133 | 2/2001 |
| JP | 2001251835 | 9/2001 |
| JP | 2002-165426 A | 6/2002 |
| SU | 1096736 | 6/1984 |
| WO | 9629774 | 9/1996 |
| WO | WO 9935731 A1 * | 7/1999 |

| | | |
|---|---|---|
| WO | 9948187 | 9/1999 |
| WO | WO-00/48297 A1 | 8/2000 |
| WO | 2004004098 A1 | 1/2004 |

OTHER PUBLICATIONS

U.S. Appl. No. 11/925,661, Petro et al.

Young, Lee W., Notification of Transmittal of the International Search Report and the Written Opinion of the International Searching Authority, or the Declaration, Patent Cooperation Treaty, Feb. 15, 2008, International application No. PCT/US 07/03734.

USPTO Office Action in U.S. Appl. No. 12/080,788, mailed Sep. 8, 2010.

USPTO Office Action in U.S. Appl. No. 11/707,285, mailed Apr. 1, 2010.

USPTO Office Action in U.S. Appl. No. 11/707,285, mailed Aug. 26, 2010.

USPTO Office Action in U.S. Appl. No. 11/925,661, mailed Mar. 30, 2010.

USPTO Office Action in U.S. Appl. No. 11/707,817 mailed Feb. 9, 2012.

USPTO Office Action in U.S. Appl. No. 11/707,817 mailed Jul. 13, 2011.

USPTO Office Action in U.S. Appl. No. 11/707,817 mailed Apr. 12, 2011.

USPTO Office Action in U.S. Appl. No. 11/707,817 mailed Jan. 31, 2011.

USPTO Office Action in U.S. Appl. No. 11/707,817 mailed Sep. 27, 2010.

USPTO Office Action in U.S. Appl. No. 11/707,817 mailed Apr. 16, 2010,.

USPTO Office Action in U.S. Appl. No, 11/707,817 mailed Nov. 5, 2009.

USPTO Office Action in U.S. Appl. No. 11/543,521 mailed Nov. 13, 2008.

USPTO Office Action in U.S. Appl. No. 11/707,285 mailed Aug. 26, 2010.

USPTO Office Action in U.S. Appl. No. 11/707,285 mailed Apr. 1, 2010.

USPTO Office Action in U.S. Appl. No. 12/080,788 mailed Sep. 8, 2010.

USPTO Office Action in U.S. Appl. No. 12/156,789 mailed Feb. 22, 2011.

USPTO Office Action in U.S. Appl. No. 12/156,789 mailed Nov. 17, 2010.

USPTO Office Action in U.S. Appl. No. 12/156,789 mailed Jun. 10, 2010.

USPTO Office Action in U.S. Appl. No. 13/044,513 mailed Dec. 1, 2011.

USPTO Office Action in U.S. Appl. No. 11/255,404 mailed Apr. 2, 2007.

USPTO Office Action in U.S. Appl. No. 11/368,186 mailed Aug. 25, 2006.

USPTO Office Action in U.S. Appl. No. 11/021,417 mailed Mar. 29, 2006.

USPTO Office Action in U.S. Appl. No. 11/021,417 mailed Sep. 29, 2005.

USPTO Office Action in U.S. Appl. No. 11/021,417 mailed Aug. 9, 2005.

* cited by examiner

SCULPTED FIELD POLE MEMBERS AND METHODS OF FORMING THE SAME FOR ELECTRODYNAMIC MACHINES

CROSS REFERENCE TO RELATED APPLICATION

This application is a Continuation-in-Part of U.S. Nonprovisional application Ser. No. 11/255,404, filed on Oct. 20, 2005, which claims priority to U.S. Provisional Application No. 60/622,258, filed on Oct. 25, 2004, all of which are herein incorporated by reference. This application also claims the benefit of U.S. Provisional Application No. 60/773,500, entitled "Field Pole Member for Electrodynamic Machines," filed on Feb. 14, 2006, the disclosure of which is incorporated by reference. Further, this application incorporates by reference the following: U.S. Pat. No. 7,061,152 B2, entitled "Rotor-Stator Structure for Electrodynamic Machines" and issued on Jun. 13, 2006.

BRIEF DESCRIPTION OF THE INVENTION

Embodiments of the invention relate generally to electric motors, alternators, generators and the like, and more particularly, to field pole member structures as well as methods of manufacture for forming such field pole member structures.

BACKGROUND OF THE INVENTION

In traditional stator and rotor structures for fractional and sub-fractional horsepower motors, permanent magnets are often integrated into a rotor assembly that typically rotates in the same plane as a ferromagnetic stator structure that provides magnetic return paths for magnet and current-generated flux. Current-generated flux, which is also referred to as Ampere Turn ("AT")-generated flux, is generated by passing a current through a coil winding that is wrapped about a pole region of a stator member structure. While functional, conventional stator and rotor structures of these and other electric motors have several drawbacks, as are discussed next.

FIG. 1A illustrates a traditional electric motor exemplifying commonly-used stator and rotor structures. Electric motor 100 is a cylindrical motor composed of a stator structure 104, a magnetic hub 106 and a shaft 102. The rotor structure of motor 100 includes one or more permanent magnets 110, all of which are attached via magnetic hub 106 to shaft 102 for rotation within stator structure 104. Stator structure 104 typically includes field poles 118, each having a coil winding 112 (only one is shown) that is wound about each field pole 118. Stator structure 104 includes slots 108 used in part to provide a wire passage for winding coil wire about stator field poles 118 during manufacturing. Slots 108 also provide magnetic separation between adjacent field poles 118. Stator structure 104 includes a peripheral flux-carrying segment 119 as part of magnetic return path 116. In many cases, stator structure 104 is composed of laminations 114, which typically are formed from isotropic (e.g., non-grain oriented), magnetically permeable material. Magnetic return path 116, which is one of a number of magnetic return paths in which permanent magnet-generated flux and AT-generated flux is present, is shown as being somewhat arcuate in nature at peripheral flux-carrying segment 119 but includes relatively sharp turns into the field pole regions 118.

One drawback of traditional electric motors, including electric motor 100, is that magnetic return path 116 requires a relatively long length for completing a magnetic circuit for flux emanating from one rotor magnet pole 110 and traversing via magnetic return path 116 to another rotor magnet pole 110. Furthermore, magnetic return path 116 is not a straight line, which is preferred for carrying magnetic flux. As shown, magnetic return path 116 has two ninety-degree turns in the stator path. Magnetic return path 116 turns once from field pole region 118 to peripheral flux-carrying segment 119, and then again from peripheral flux-carrying segment 119 to another field pole region 118. Both of these turns are suboptimal for carrying flux efficiently. As implemented, magnetic return path 116 requires more material, or "back-iron," than otherwise is necessary for carrying such flux between field poles. Consequently, magnetic return paths 116 add weight and size to traditional electric motors, thereby increasing the motor form factor as well as cost of materials to manufacture such motors.

Another drawback of conventional electric motors is that laminations 114 do not effectively use anisotropic materials to optimize the flux density and reduce hysteresis losses in flux-carrying poles, such as through field poles 118, and stator regions at peripheral flux-carrying segment 119. In particular, peripheral flux-carrying segment 119 includes a non-straight flux path, which limits the use of such anisotropic materials to reduce the hysteresis losses (or "iron losses"). Hysteresis is the tendency of a magnetic material to retain its magnetization. "Hysteresis loss" is the energy required to magnetize and demagnetize the magnetic material constituting the stator regions, wherein hysteresis losses increase as the amount of magnetic material increases. As magnetic return path 116 has one or more turns of ninety-degrees or greater, the use of anisotropic materials, such as grain-oriented materials, cannot effectively reduce hysteresis losses because the magnetic return path 116 in peripheral flux-carrying segment 119 would cut across the directional orientation of laminations 114. For example, if direction 120 represents the orientation of grains for laminations 114, then at least two portions of magnetic return path 116 traverse across direction 120 of the grain, thereby retarding the flux density capacity of those portions of stator peripheral flux-carrying segment 119. Consequently, anisotropic materials generally have not been implemented in structures similar to stator structure 104 since the flux paths are usually curvilinear rather than straight, which limits the benefits provided by using such materials.

Yet another drawback of conventional electric motors is the relatively long lengths of magnetic return path 116. Changing magnetic fields, such as those developed at motor commutation frequencies, can cause eddy currents to develop in laminations 114 in an orientation opposing the magnetic field inducing it. Eddy currents result in power losses that are roughly proportional to a power function of the rate at which the magnetic flux changes and roughly proportional to the volume of affected lamination material.

Other drawbacks of commonly-used electric motors include the implementation of specialized techniques for reducing "cogging," or detent torque, that are not well-suited for application with various types of electric motor designs. Cogging is a non-uniform angular torque resulting in "jerking" motions rather than a smooth rotational motion. This effect usually is most apparent at low speeds and applies additive and subtractive torque to the load when field poles 118 are at different angular positions relative to magnet poles. Further, the inherent rotational accelerations and decelerations cause audible vibrations.

FIG. 1B illustrates an axial motor as another type of traditional electric motor exemplifying commonly-used stator and rotor structures. Conventional axial motor geometries have been used to overcome the disadvantages of other common motor technologies, including radial motors. But when axial motors are designed in accordance with conventional design tenets relating to radial geometries, inherent limitations can arise that restrict the number of applications for which axial motors can be used. As such, the use of axial motors has been somewhat limited to relatively specialized niches.

Further, axial motors are usually constructed with an array of longitudinal field poles having perpendicular field pole faces at each end. The perpendicular field pole faces are usually positioned to face single or dual rotating planar assemblies of magnets, as shown in FIG. 1B. Axial motor 121 is shown to include arrays of longitudinal field poles as stator assembly 126, which is in between two rotating planar assemblies of magnets 131, which are mounted on a front magnet disk 124 and a back magnet disk 128. Also shown, are a front cover plate 122 and a rear cover plate 130 that contain bearings to hold the motor shaft in position. The field poles of stator assembly 126 typically are made of assemblies of steel laminations with perpendicular field pole faces to maintain a constant air gap with the rotating magnets 131.

A traditional axial motor typically has a fixed number or area of pole faces that can confront an air gap area, and, thus, can produce torque that is limited to the relative strength of the magnet. This means that to make a high torque motor, high strength (and therefore high cost) magnets are generally required. This, among other things, reduces the attractiveness of the axial motor design.

In view of the foregoing, it would be desirable to provide a field pole member as a structure that reduces the above-mentioned drawbacks in electric motors and generators, and to, for example, increase output torque and efficiency either on a per unit size or per unit weight basis, or both, as well as to conserve resources during manufacturing and/or operation.

SUMMARY OF THE INVENTION

A method, apparatus, article of manufacture and system for producing a field pole member for electrodynamic machinery are disclosed to, among other things, reduce magnetic flux path lengths, and to eliminate back-iron for increasing torque and/or efficiency per unit size (or unit weight) as well as for reducing manufacturing costs. In one embodiment, a field pole member structure can be formed to, for example, either reduce the length of magnetic flux paths or substantially straighten those paths through the field pole members, or both. In another embodiment, a method provides for the construction of field pole members for electrodynamic machines. The method includes positioning a plurality of magnetic flux conductors for affixation, for example, together longitudinally to form at least a field pole core of a field pole member. The method also can include forming a pole face at an end of the field pole member. That is, the method can include forming one or more pole faces at the one or more ends of the field pole member. In one embodiment, the field pole core is a substantially straight field pole core to provide either a straight flux path or a substantially straight flux path between the pole face and another pole face or the other end of the field pole member. In some embodiments, the methods of manufacture provide for field pole member structure that, among other things, can enhance motor efficiencies, as well as conserve resources to reduce manufacturing costs by, for example, minimizing wastage. The various embodiments relating to field pole member manufacturing can configure the field pole members, for example, to accommodate single and multiple magnet rotors, whereby the magnets can have any type of shape.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings. Note that most of the reference numerals include one or two left-most digits that generally identify the figure that first introduces that reference number.

DETAILED DESCRIPTION

Definitions

Figure 1A:
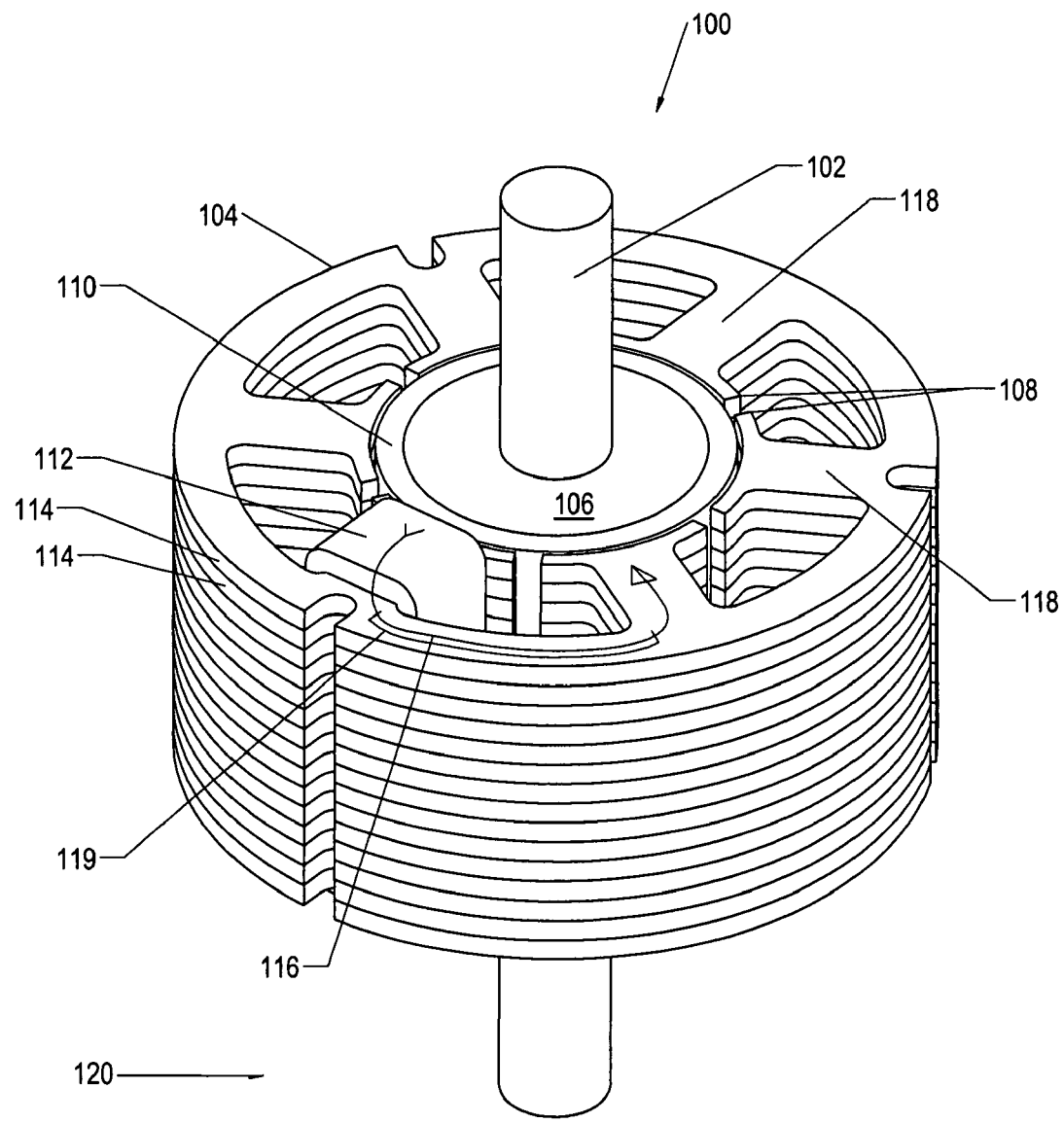
FIG. 1A illustrates a commonly-used radial stator structure implemented in a traditional electric motor.
Figure 1B:
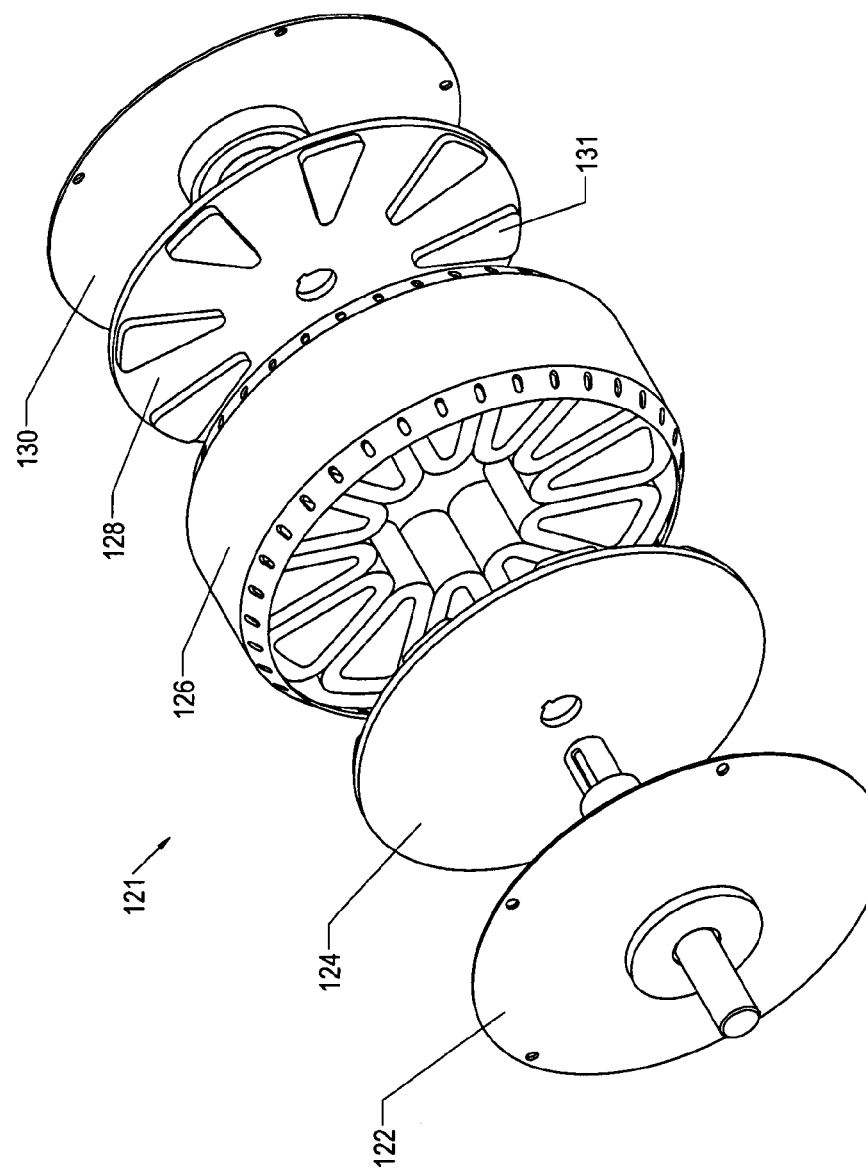
FIG. 1B illustrates an axial motor as another type of traditional electric motor.

The following definitions apply to some of the elements described with respect to some embodiments of the invention. These definitions may likewise be expanded upon herein.

As used herein, the term "air gap" refers to a space, or a gap, between a magnet surface and a confronting pole face. Such a space can be physically described as a volume bounded at least by the areas of the magnet surface and the pole face. An air gap functions to enable relative motion between a rotor and a stator, and to define a flux interaction region. Although an air gap is typically filled with air, it need not be so limiting.

As used herein, the term "back-iron" commonly describes a physical structure (as well as the materials giving rise to that physical structure) that is often used to complete an otherwise open magnetic circuit. In particular, back-iron structures are generally used only to transfer magnetic flux from one magnetic circuit element to another, such as either from one magnetically permeable field pole member to another, or from a magnet pole of a first magnet to a magnet pole of a second magnet, or both, without an intervening ampere-turn generating element, such as coil, between the field pole members or the magnet poles. Furthermore, back-iron structures are not generally formed to accept an associated ampere-turn generating element, such as one or more coils.

As used herein, the term "coil" refers to an assemblage of successive convolutions of a conductor arranged to inductively couple to a magnetically permeable material to produce magnetic flux. In some embodiments, the term "coil" can be described as a "winding" or a "coil winding." The term "coil" also includes foil coils (i.e., planar-shaped conductors that are relatively flat).

As used herein, the term "coil region" refers generally to a portion of a field pole member around which a coil is wound.

As used herein, the term "core" refers to a portion of a field pole member where a coil is normally disposed between pole shoes and is generally composed of a magnetically permeable material for providing a part of a magnetic flux path. In some embodiments, the formation of the "core" also forms the field pole member with or without pole faces. In other embodiments, the core is formed as a base structure onto which end caps or the like can be formed.

As used herein, the term "field pole member" refers generally to an element composed of a magnetically permeable material and being configured to provide a structure around which a coil can be wound (i.e., the element is configured to receive a coil for purposes of generating magnetic flux). In some embodiments, a field pole member includes a core (i.e., core region) and at least two pole shoes, each of which is generally located near a respective end of the core. But in other embodiments, a field pole member includes a core and only one pole shoe. In some embodiments, the term "field pole member" can be described generally as a "stator-core." In at least one embodiment, a field pole member generally has an elongated shape such that the length of the field pole member (e.g., the distance between the ends of the field pole member) is generally greater than its width (e.g., the width of the core).

As used herein, the term "active field pole member" refers to an assemblage of a core, one or more coils, and at least one pole shoe. In particular, an active field pole member can be described as a field pole member assembled with one or more coils for selectably generating ampere-turn flux. In some embodiments, the term "active field pole member" can be described generally as a "stator-core member."

As used herein, the term "ferromagnetic material" refers to a material that generally exhibits hysteresis phenomena and whose permeability is dependent on the magnetizing force. Also, the term "ferromagnetic material" can also refer to a magnetically permeable material whose relative permeability is greater than unity and depends upon the magnetizing force.

As used herein, the term "field interaction region" refers to a region where the magnetic flux developed from two or more sources interact vectorially in a manner that can produce mechanical force and/or torque relative to those sources. Generally, the term "flux interaction region" can be used interchangeably with the term "field interaction region." Examples of such sources include field pole members, active field pole members, and/or magnets, or portions thereof. Although a field interaction region is often referred to in rotating machinery parlance as an "air gap," a field interaction region is a broader term that describes a region in which magnetic flux from two or more sources interact vectorially to produce mechanical force and/or torque relative to those sources, and therefore is not limited to the definition of an air gap (i.e., not confined to a volume defined by the areas of the magnet surface and the pole face and planes extending from the peripheries between the two areas). For example, a field interaction region (or at least a portion thereof) can be located internal to a magnet.

As used herein, the term "generator" generally refers to an electrodynamic machine that is configured to convert mechanical energy into electrical energy regardless of, for example, its output voltage waveform. As an "alternator" can be defined similarly, the term generator includes alternators in its definition.

As used herein, the term "magnet" refers to a body that produces a magnetic field externally unto itself. As such, the term magnet includes permanent magnets, electromagnets, and the like.

As used herein, the term "motor" generally refers to an electrodynamic machine that is configured to convert electrical energy into mechanical energy.

As used herein, the term "magnetically permeable" is a descriptive term that generally refers to those materials having a magnetically definable relationship between flux density ("B") and applied magnetic field ("H"). Further, "magnetically permeable" is intended to be a broad term that includes, without limitation, ferromagnetic materials, including laminate steels and cold-rolled grain oriented ("CRGO") steels, powder metals, soft magnetic composites ("SMCs"), and the like.

As used herein, the term "pole face" refers to a surface of a pole shoe that faces at least a portion of the flux interaction region (as well as the air gap), thereby forming one boundary of the flux interaction region (as well as the air gap). In some embodiments, the term "pole face" can be described generally as either a "stator surface" or a "flux interaction surface" (or a portion thereof), or both.

As used herein, the term "pole shoe" refers to that portion of a field pole member that facilitates positioning a pole face so that it confronts a rotor (or a portion thereof), thereby serving to shape the air gap and control its reluctance. A pole shoe of a field pole member is generally located near an end of the core starting at or near a coil region and terminating at the pole face. In some embodiments, the term "pole shoe" can be described generally as a "stator region."

As used herein, the term "soft magnetic composites" ("SMCs") refers to those materials that are comprised, in part, of insulated magnetic particles, such as insulation-coated magnetically permeable powder metal materials that can be molded to form an element of the rotor-stator structure of the present invention.

As used herein, the term "transition region" refers to an optional portion of a pole shoe that facilitates offsetting or diverting a segment of a flux path (e.g., within a core region) to another segment of the flux path (e.g., within a pole shoe). One or more pole shoes can implement transition regions to improve motor volumetric utilization (e.g., by placing coils in a compact configuration nearer to an axis of rotation). Generally, the transition region can keep the reluctance of the field pole member relatively low while facilitating compaction of the elements constituting an electrodynamic machine. Such elements include shafts, field pole members, magnets and the like.

Discussion

Figure 2:
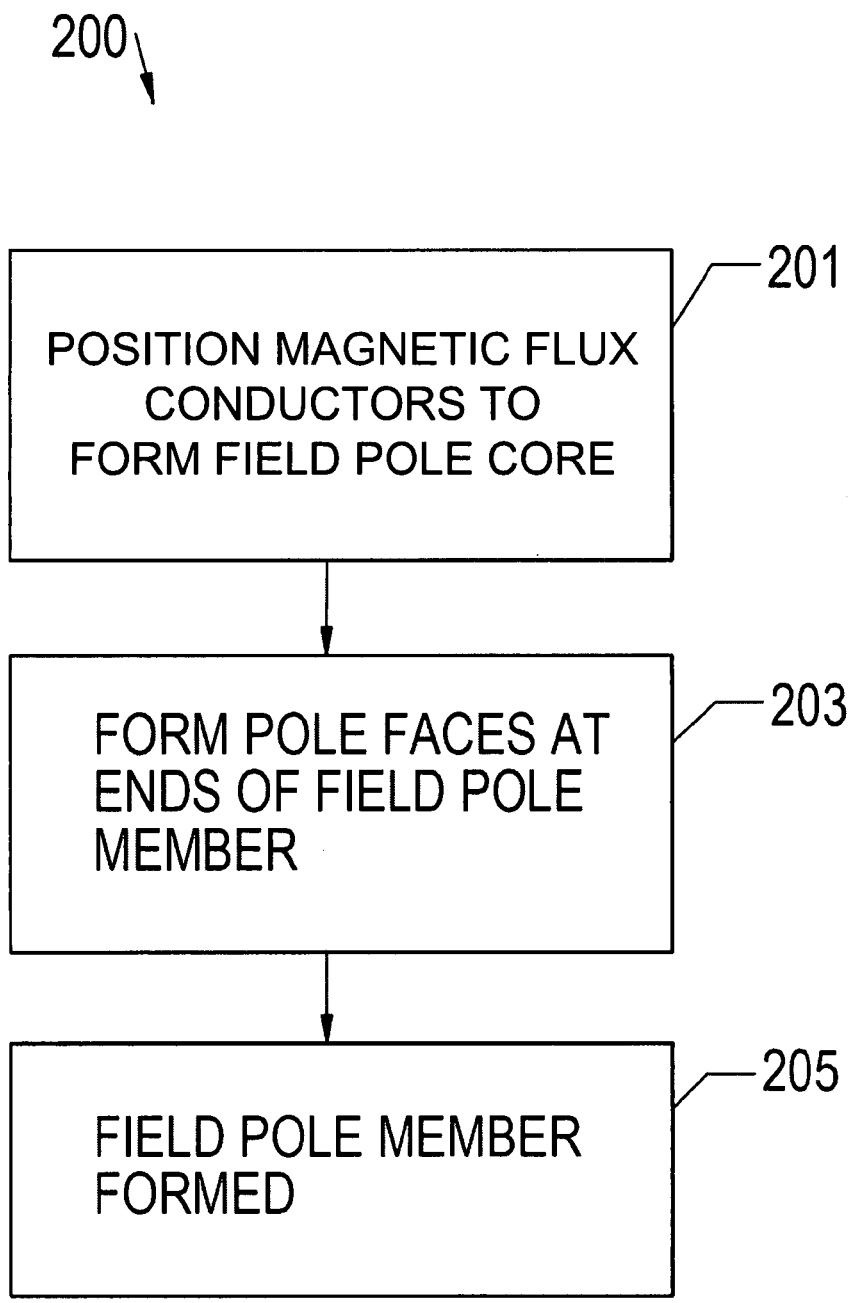
FIG. 2 is a generalized flow for producing a field pole member in accordance with a specific embodiment of the invention.

FIG. 2 is a generalized flow for producing a field pole member in accordance with a specific embodiment of the present invention. Flow 200 provides for a manufacturing technique to produce field pole member structures that can carry amounts of magnetic flux in, for example, unidirectional direction or a substantially unidirectional direction. These structures can provide for increased performance and economical manufacturing of electrodynamic machines, such as electric motors and generators, as well as electric solenoids and other applications. In one embodiment, flow 200 positions magnetic flux conductors in relatively close proximity for affixation together to form a field pole core of a field pole member at 201. Flow 200 also can be used to form the field pole member itself, according to some embodiments. As used herein, the term "magnetic flux conductor" in some embodiments describes an elongated structure composed of magnetically permeable material. Optionally, a magnetic flux conductor can have grain orientation along a longitudinal direction (i.e., lengthwise). Examples of magnetic flux conductors include wires and laminations composed of magnetically permeable material, such as silicon steel. At 203, pole faces can be formed with respect to the field pole cores to provide flux interaction surfaces. These pole faces can be configured to confront, for example, conical-shaped or cylindrical-shaped magnets as described in U.S. Pat. No. 7,061, 152 B2 and U.S. patent application Ser. No. 11/255,404, respectively. In one embodiment the pole faces can be sculpted to form sculpted pole faces to confront conical-shaped, cylindrical-shaped magnets, or the like. In various other embodiments, the pole faces can be configured to confront other magnets having any other kind of shapes, such as trapezoidal magnets in the case of linear and/or rotary motors. A field pole member is produced at 205. In various embodiments, flow 200 can affix magnetic flux conductors together at 201 prior to or subsequent to forming pole faces at 203. In one embodiment, flow 200 can affix magnetic flux conductors together at 201 at the same time or at substantially the same time as forming pole faces at 203.

Figure 3:
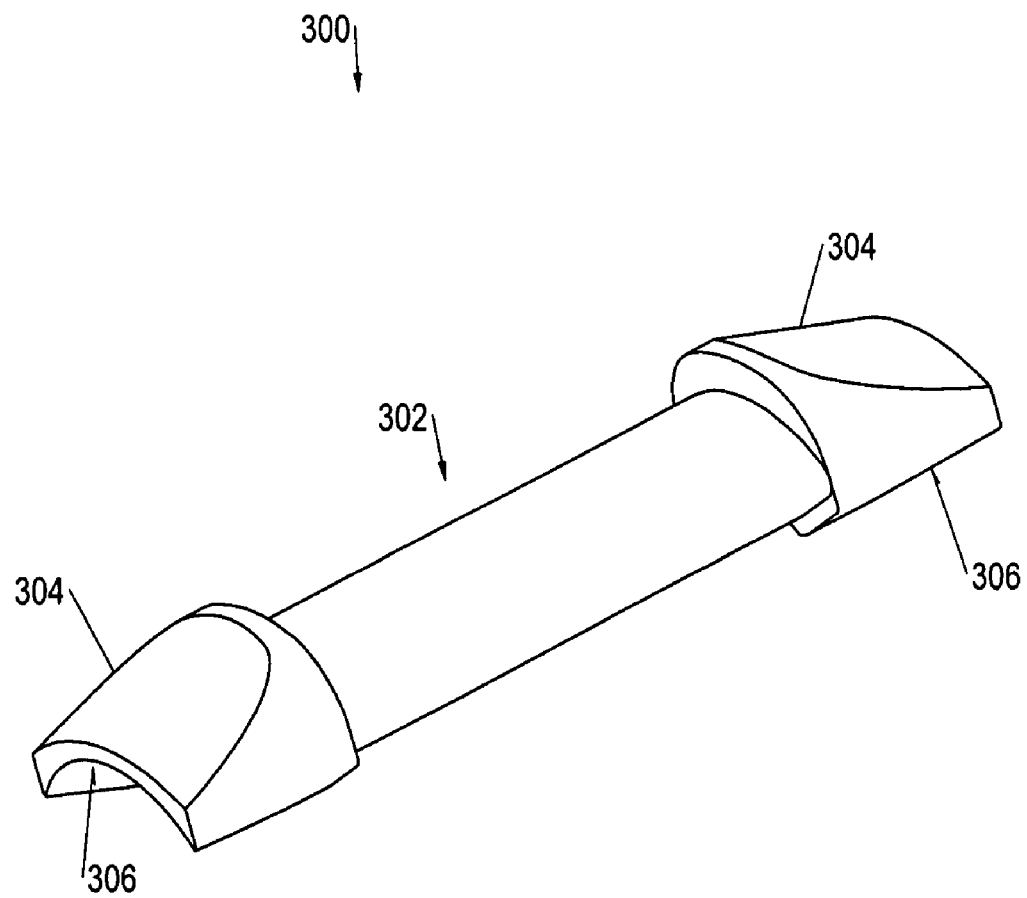
FIG. 3 illustrates an example of a field pole member produced by a specific embodiment of the invention.

FIG. 3 illustrates an example of a field pole member produced by a specific embodiment of the present invention. Field pole member 300 includes a field pole core 302 and pole shoe members 304. Each pole shoe member 304 includes an example of a pole face, which is pole face 306. In one embodiment, field pole core 302 is over-molded to form pole shoe members 304. In some cases, over-molding also encapsulates the magnetic flux conductors constituting field pole core 302. In other cases, over-molding only forms pole shoe members 304. As used herein, the term "cap" in some embodiments refers to pole shoe members 304. In at least one embodiment, field pole core 302 is a straight or a substantially straight field pole core and provides a substantially straight flux path between pole faces 306. In other embodiments, field pole core 302 can include or can be coupled to transition regions. In a specific embodiment, pole shoe members 304 are formed as "caps" composed of magnetically permeable material. As such, pole shoe members 304 can be formed by pressing magnetic powders into a specific shape that defines the contours of pole faces 306. The individual magnetic powder particles that are used to form pole shoe member 304 can, at least in some cases, have an insulation coating, which improves the loss characteristics of field pole member 300.

Figure 10:
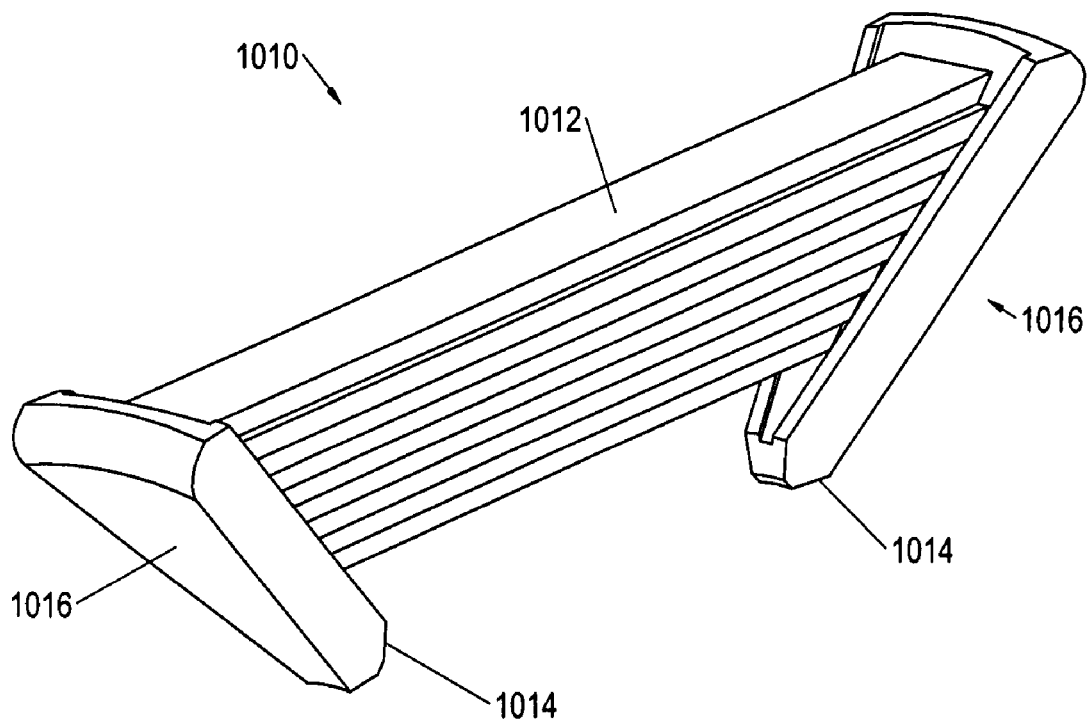
FIG. 10 illustrates an integrating process to form pole shoe faces in accordance with an embodiment of the invention.

One example of implementing caps as pole shoe members 304 is shown in FIG. 10. In as least one embodiment, field pole member 300 has substantially the same desirable magnetic properties and low loss characteristics found in field pole members produced with laminations alone (i.e., with pole faces being formed in the laminations). Pressed end-caps and over-molding allow designers additional freedom to create field pole member and stator end-geometries using laminations, wires, or any other type of magnetic flux conductor.

Figure 4:
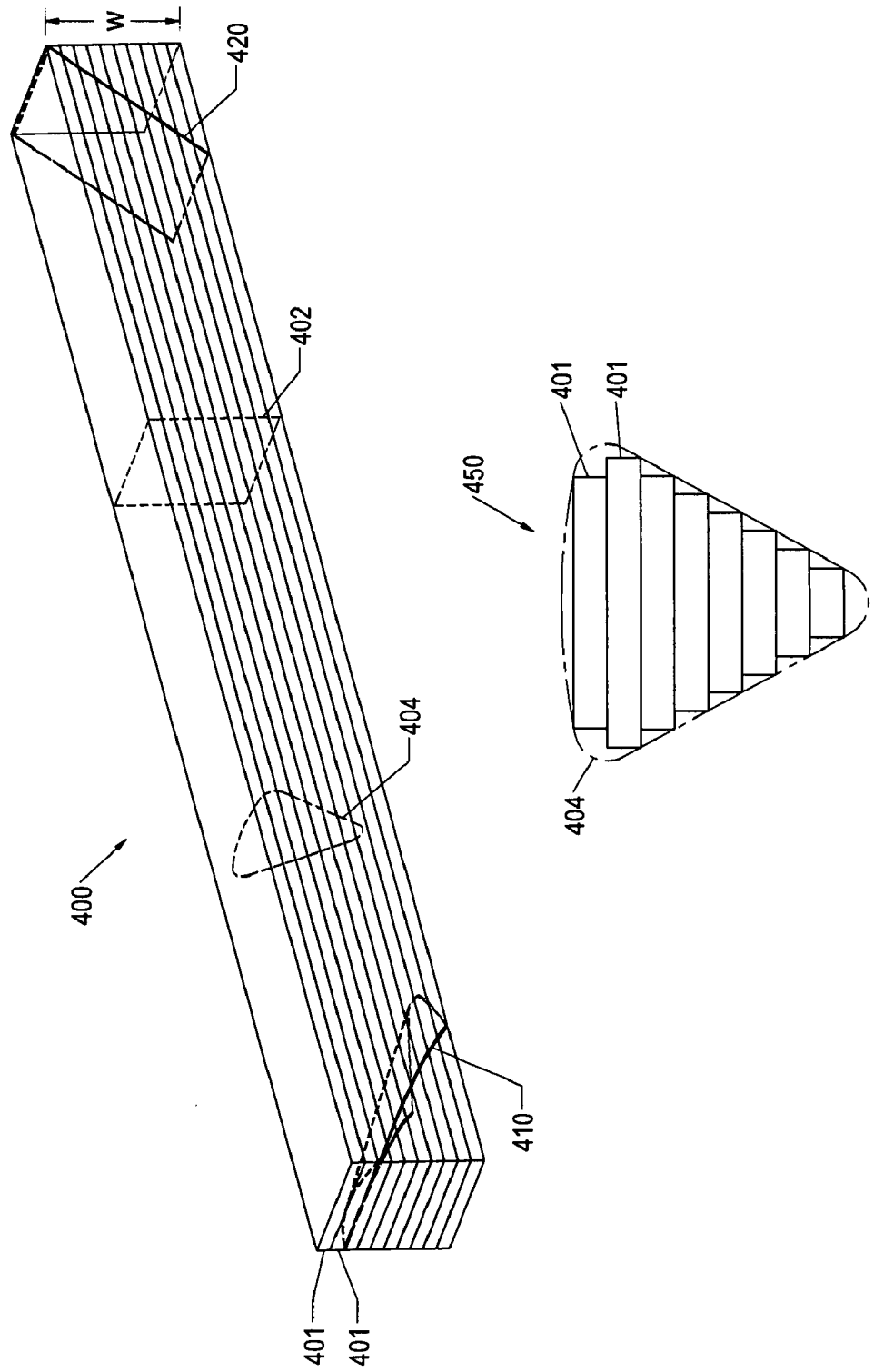
FIG. 4 depicts an example of a field pole core produced by a specific embodiment of the invention.

FIG. 4 depicts an example of a field pole core produced by a specific embodiment of the invention. As shown in this example, field pole core 400 includes a number of laminations 401. In one embodiment, field pole core 400 has a square-shaped cross-section 402 if each of laminations 401 has the same width, "W." In at least one embodiment, one or more laminations 401 have varying widths, W. For example, by varying widths of lamination 401, a teardrop-shaped cross-section 404 can be formed for field pole core 400. In at least one embodiment, laminations 401 are can be isolated (e.g., electrically, magnetically, etc.) from each other by, for example, being coated with an electrically-insulating material, such as an oxide, glass coating or the like. One example of an electrically-insulating material is black oxide. In a specific embodiment, laminations 401 can be affixed to each other with a bonding agent. In various embodiments of the invention, the orientation of the lamination widths, W, can be either radial (or substantially radial) or concentric (substantially concentric), or in any other orientation, relative to an axis of rotation. According to one embodiment, the shape of the field pole core and/or the manufacturing process cost, in whole or in part, can determine the orientation in which to stack laminations 401.

Cross-section 450 of an envelope 404 is shown in FIG. 4, which shows laminations 401 having varying widths, W. The varying widths can produce field pole core 400 having teardrop-shaped cross-section 450 for envelop 404. In one embodiment, one or both ends of field pole core 400 can include a pole face 410 formed to provide a uniform air gap or a substantially uniform air gap. Or, in some embodiments, pole face 410 is formed to mate with a cap (not shown) having, for example, a sculpted mating surface. In various embodiments, pole face 410 is formed by, for example, sculpting one or more ends of field pole core 400 (to form a field pole member), or sculpting a cap for a pole shoe. As used herein, the term "sculpted pole face" can generally refer, at least in one embodiment, to a "contoured" pole face or an "angled" pole face. Note that in at least one embodiment, pole face 410 can be formed as a contoured pole face, which includes a contoured surface. The contoured surface can be substantially coextensive with a curved surface, whereby the degree of curvature can be fixed or variable over the surface of pole face 410. As such, pole face 410 can be referred to as a contoured pole face 410, according to at least one embodiment. In some cases, the curved surface can include a portion that is coextensive with an arc that lies on a surface of, for example, a cone or a cylinder. Further, the contoured surface can be a concave surface in one embodiment. In another embodiment, one or both ends of field pole core 400 can include a flat or a substantially flat, but angled pole face 420. This angled pole face can be formed by cutting field pole member 400 at its ends so that each of the pole faces is contoured either to confront a permanent magnet or to readily mate with a cap, or both. In some embodiments, the terms "cut" and "cutting," as applied to field pole members, refer to the separation of magnetic flux conductors from a main body of starting material, such as from rolls of slitted laminations or from rolls of wires. Thus, cutting field pole members can form "sculpted" pole faces in some embodiments. Generally, such "cuts" are lateral in nature (i.e., generally occurring along a width of a magnetic flux conductor) rather than longitudinal. As used herein, the term "angled," in at least one embodiment, refers to a characteristic of a surface (or a portion thereof) that faces at least a portion of the flux interaction region (as well as the air gap). The surface can be a flux interaction surface of a pole shoe (e.g., a pole face) or a surface of a magnet. According to various embodiments, angled pole face 420 can be adapted to confront, for example, an angled surface of a trapezoidal magnet implemented in, for example, a linear or a rotary motor.

Figure 5:
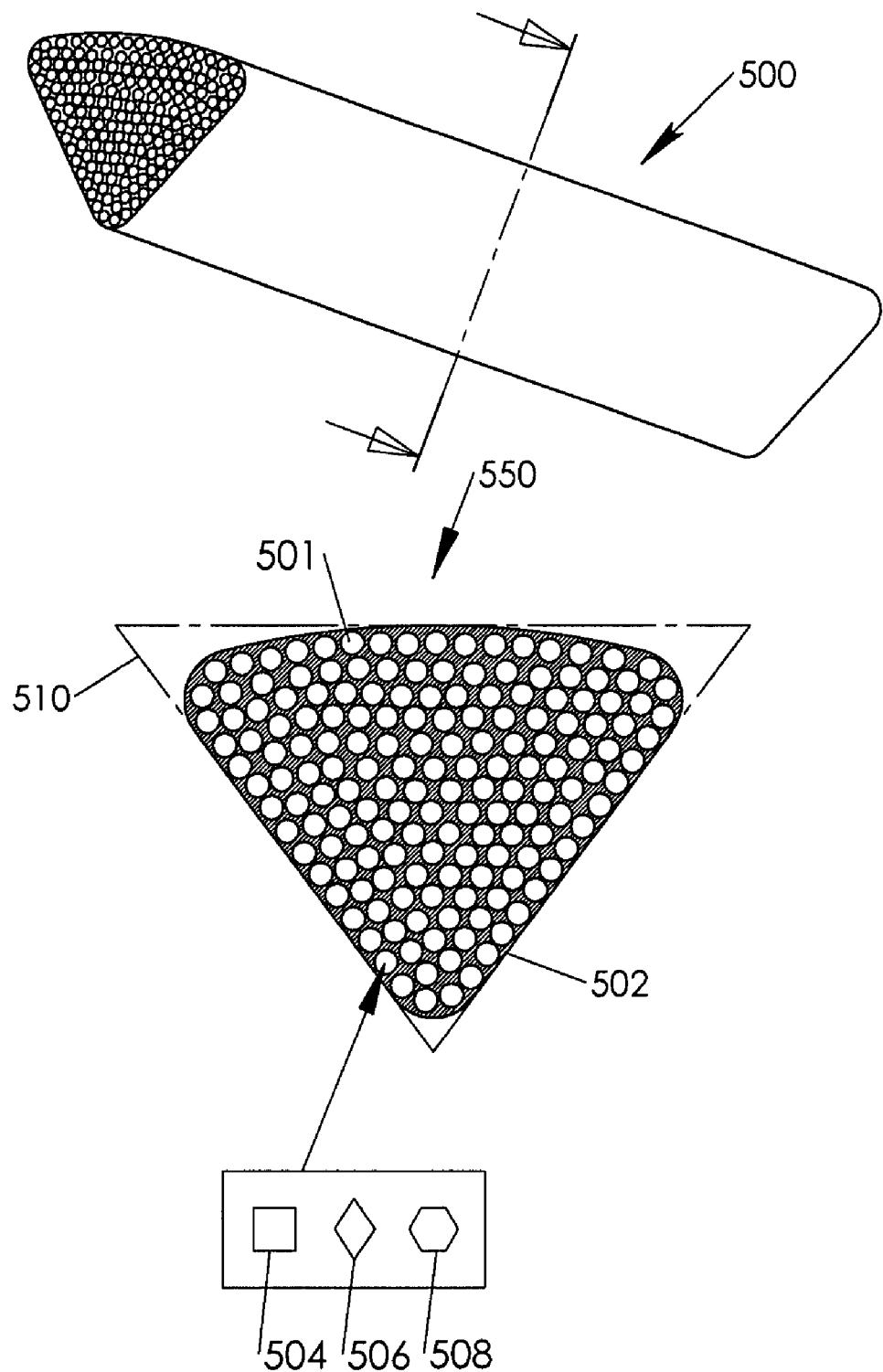
FIG. 5 depicts an example of another field pole core produced by another specific embodiment of the invention.

FIG. 5 depicts an example of another field pole core produced by another specific embodiment of the invention. Field pole core 500 includes a number of wires as magnetic flux conductors. As cross-sectional view ("A-A") 550 depicts, field pole core 500 includes a number of wires 501 and interstitial material 502. In the example shown, wires 501 have circular cross-sections. Wires 501 can provide relatively high magnetic flux carrying capabilities for field pole core 500 similar to field pole cores constructed of magnetic steel laminations. As such, wires 501 allow a variety of field pole core shapes that generally might otherwise be difficult and/or expensive to create with other techniques, such as with laminations, according to some embodiments. For example, FIG. 5 shows that wires 501 can be aggregated to form a triangular cross-section shape 510 for field pole core 500. Wires 501 can also be used to form other shapes, such as oval or tear-drop cross-section shapes, for field pole core 500. As used herein, the term "envelope" can refer generally, at least in some embodiments, to one or more surfaces that, as boundaries, encompass magnetic flux conductors. An envelope can have a cross-section shaped as either a square, a circle, a tear drop, an oval, or any other shape that can be produced by a mold, a die, a compaction wheel, or the like. In at least one instance, the cross-section for an envelop lies in a plane substantially perpendicular to a line parallel to the length of a magnetic flux conductor. In at least one embodiment, wires 501 can be isolated from each other by implementing, for example, a coating that includes an electrically-insulating material, such as oxide or the like.

Wires 501 can lower losses generally associated with, for example, laminations because wires 501 can provide reduced cross sections and cross-sectional area therein, thereby reducing the eddy currents therein. In various embodiments, wires 501 can have square-shaped cross sections 504, diamond-shaped cross sections 506, and hexagonal-shaped cross-sections 508, among other types of shapes for cross-sections of wires 501. Cross-sections 504 and 506 can, for example, reduce the volume of interstitial material 502. In a specific embodiment, interstitial material 502 can include a bonding agent and/or magnetic particles. The bonding agent can affix wires 501 to each other, whereas the magnetic particles can enhance the flux-carrying capabilities of field pole core 500 by filling what otherwise may be voids among wires 501 with flux-carrying material. Examples of magnetic particles include powders composed of soft magnetic composites ("SMCs") as "magnetic powder." Note that use of composite material, such as SMC, can, at least in one embodiment, be used to manufacture complex field pole member structures that can have negligible or no material waste of wire 501, as well as relatively very little amount of magnetic powder in interstitial material 502. In some cases, magnetic particles can have an insulating exterior shell around each powder particle, such iron oxide. In one embodiment, interstitial material 502 excludes magnetic particles and only includes binding agent. In other embodiments, interstitial material 502 can include either magnetic particles or binding agents, or both.

Figure 6:
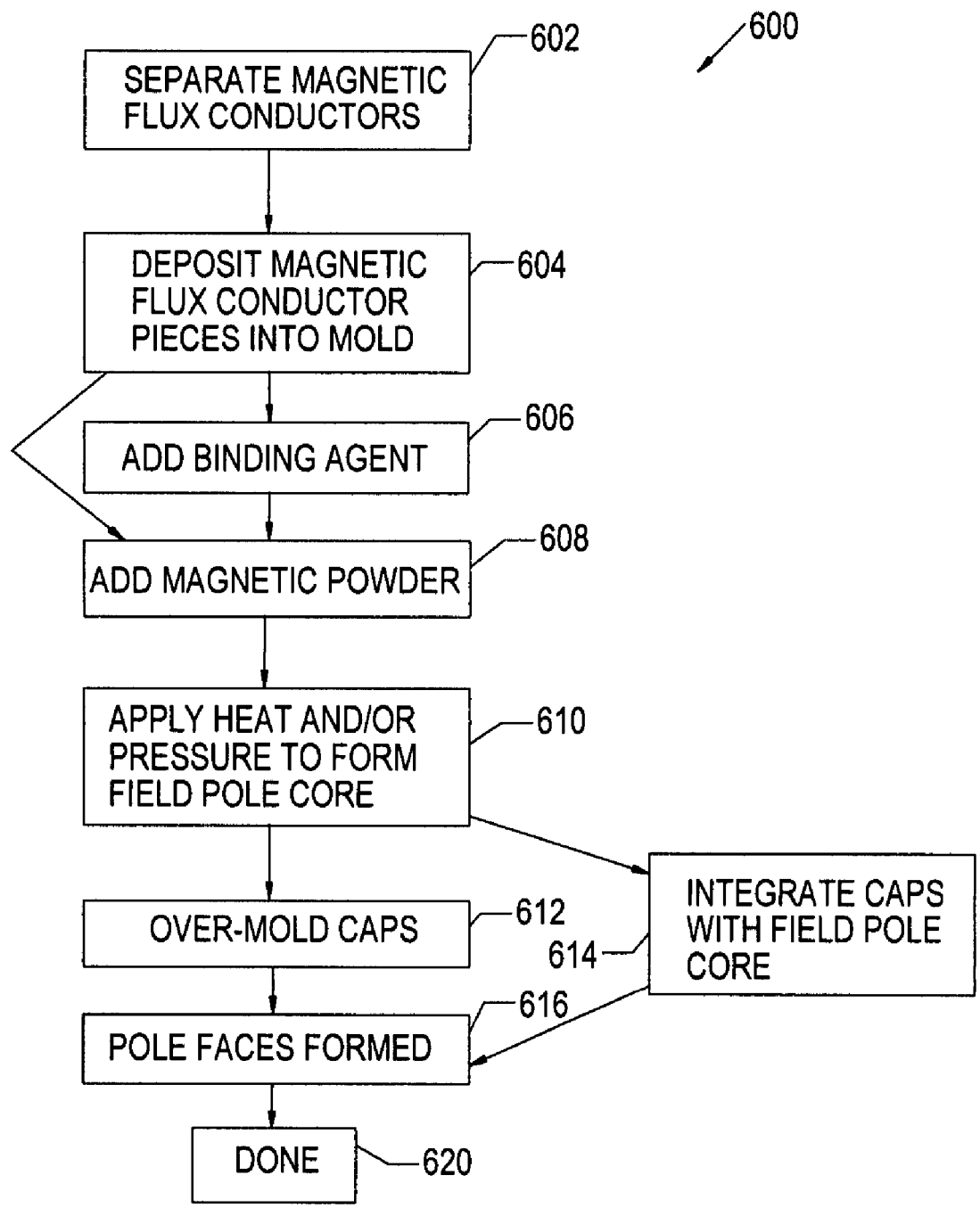
FIG. 6 is a flow diagram illustrating an example of a manufacturing flow for producing a field pole member, according to an embodiment of the invention.

FIG. 6 is a flow diagram illustrating an example of a manufacturing flow for producing a field pole member, according to an embodiment of the invention. At 602, a number of magnetic flux conductors are cut to a length that generally approximates the length of the finally manufactured field pole core. In some embodiments, each magnetic flux conductors are cut at an identical length (e.g., when implementing caps), wherein in other embodiments, each of the magnetic flux conductor can be cut to a length that approximates the distance between pole faces. In at least one embodiment, the lengths of the magnetic flux conductors can vary to accommodate the varying distance between the pole faces. At 604, the number of magnetic flux conductors can be deposited into a mold, which can be described as a location or as an approximate location at which affixation of magnetic flux conductors occurs. At least one example of a mold can form additional structural and/or functional features for a field pole member, such as sculptured pole faces and/or locating features. Optionally, a binding (or bonding) agent can be introduced into the mold at 606 if such an agent has yet to be applied either to the magnetic flux conductors or to the starting material (e.g., a steel coil) from which the magnetic flux conductors are formed. A binding agent can be used to hold the field pole member assembly together. Optionally, the binding agent can be a powdered material mixed with the magnetic powder at 608, and heated and/or pressurized at 610 to cure the bonding agent. Alternatively the binding agent can be a penetrating adhesive having a relatively low viscosity, which is applied at 606 once the mold has been packed with wires at 604 and magnetic powder at 608. Note that when the magnetic flux conductors are laminations, then adding magnetic powder at 608 can be omitted as there can be negligible or no voids in the interfaces between laminations.

In some embodiments, the introduction of a binding agent occurring at 606 can be performed prior to the separation (e.g., cutting) of magnetic flux conductors from that material from which they originate. For example, if magnetic flux conductors are laminations, then the binding agent can be applied to a roll (or coil) of starting material (e.g., a pre-cut roll). In this case, the binding agent can be applied as a coating prior to slitting (e.g., shear slitting) or any other form of longitudinally-oriented cutting. In at least one embodiment, flow 600 applies the binding agent between 602 and 604. That is, a binding agent, such as a thin film adhesive, can be applied onto elongated strips after slitting process has formed the strips from the starting material.

Flow 600 continues from 610 to form pole shoe members 304 (FIG. 3) or "caps." In one embodiment, flow 600 moves to 612 to form pole shoe members as caps by using an over-molding technique. Here, an over-molding operation can use an adhesive (e.g., glue) combined with insulated magnetic powder material to form a desired shape for the pole faces at 616. By over-molding at least the ends of the field pole core, the pole faces can be shaped in a controlled manner for producing flux interaction surfaces that can have characteristics for forming an air gap with a magnet, such as a conical or cylindrical magnet. In another embodiment, flow 600 moves from 610 to 614. Here, pole shoe members 304 (FIG. 3) or "caps" can be integrated with a field pole core ("F.P. core") to form a field pole member having pole faces. At 614, the integration of the pole shoe members to, for example, the ends of a field pole core can include applying a binding adhesive with or without a soft magnetic composite powder to the ends of the field pole core, and pressing the pole shoe members to the ends of the field pole to form a specific shape for a pole face at 616. As such, the pole face formed at 616 can be a sculpted pole face. Thus, a motor manufacturer can reduce an inventory of field pole members for electrodynamic machines requiring either conical or cylindrical magnets, for example. Interchangeable caps adapted for the conical and cylindrical magnets can be integrated with a common field pole core as needed, thereby preventing build up unnecessary inventory. When integrating (e.g., by fastening) the pole shoe members to the field pole core, a combination of a binding adhesive and a magnetic powder filler can be used. While the magnetic flux carrying capability of the pole shoe members and the magnetically-filled binding adhesive may differ from those field pole cores composed of laminations, the relatively short flux travel distance across the binding adhesive minimally might affect the flux-carrying capability of the field pole member. At 620, flow 600 concludes ("done") by producing a field pole member. In some embodiments, flow 600 can form transitions regions with respect to the field pole members.

Figure 7:
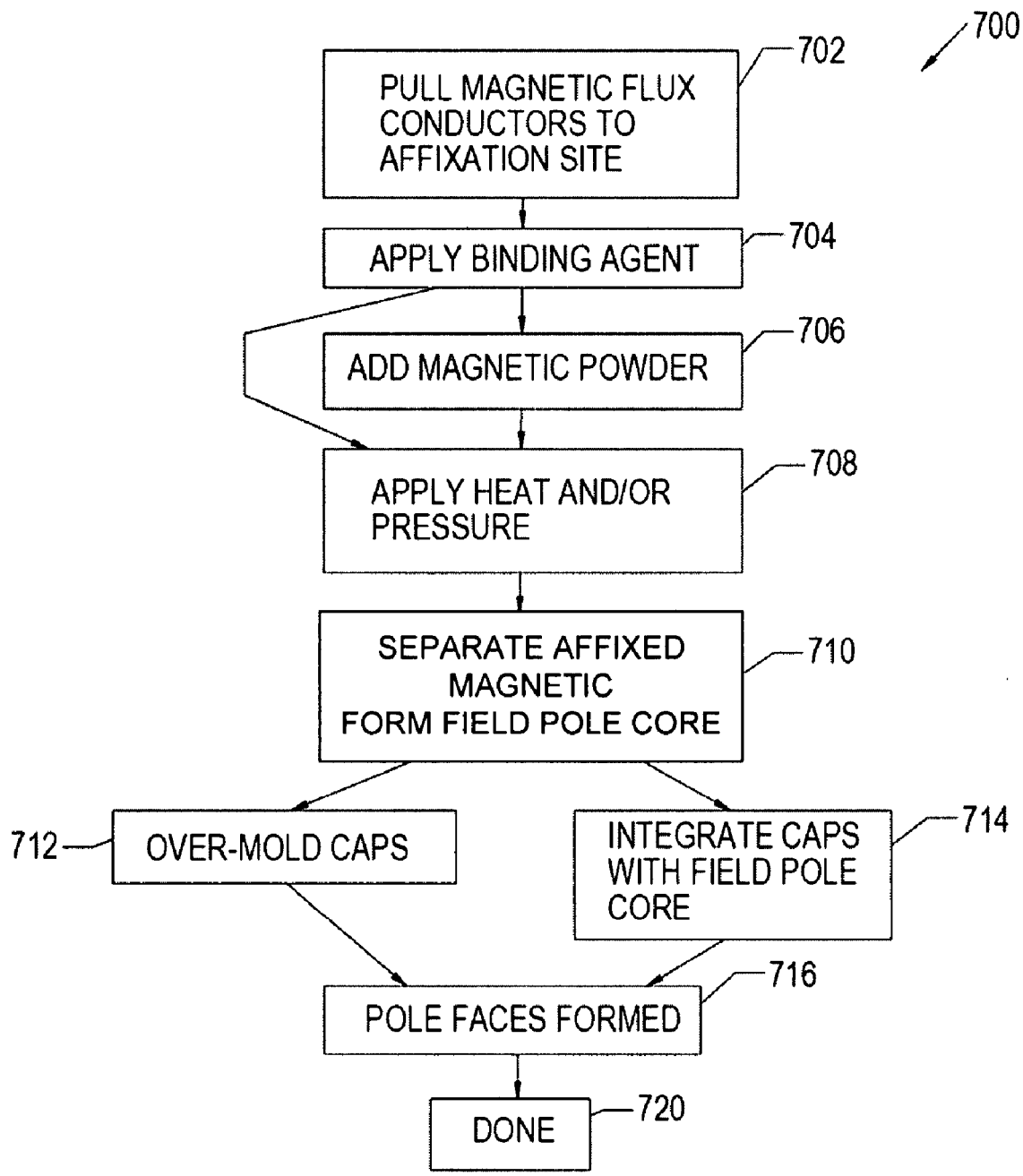
FIG. 7 is a flow diagram illustrating another example of a manufacturing flow for producing a field pole member, according to another embodiment of the invention.

FIG. 7 is a flow diagram illustrating another example of a manufacturing flow for producing a field pole member, according to another embodiment of the invention. At 702, a number of magnetic flux conductors are pulled to an affixation site at which the magnetic flux conductors can be affixed to each other. For instance, an affixation site can include a die. In other instances, the affixation site can include shaping members, such as a set of mating wheels (e.g., shaped mating wheels). An example of such wheels are described in FIG. 8B as compaction wheels. The die and/or mating wheels maintain a cross-sectional shape for the field pole core. As such, mating wheels can form a number of cross-sectional shapes, such as a round, oval and tear drop shapes. So at 702, the magnetic flux conductors are each of pulled from a supply of elongated magnetic flux conductors, such as from a number of spools. Generally, magnetic flux conductors are pulled as elongated magnetic flux conductors having lengths that are greater than the length of the field pole core. As used herein, the term "elongated magnetic flux conductors" refers in some embodiments to magnetic flux conductors that have yet to be cut to form a field pole member of the embodiments of the invention.

At 704, a binding agent is applied to the magnetic flux conductors. For example, the binding agent can be aerosolized and deposited on (i.e., sprayed on) each of the magnetic flux conductors as they are pulled from the supply of elongated magnetic flux conductors to a die (i.e., the affixation site). Applying the binding agent in an aerosol form is well-suited for application with laminations. As another example, the binding agent can be rolled onto the magnetic flux conductors. In alternative embodiments, the introduction of a binding agent at 704 can be implemented prior to pulling magnetic flux conductors to the affixation site at 702. For example, a binding agent can be applied to either a steel coil prior to slitting of laminates, or to a wire before it is rolled onto a spool.

If the magnetic flux conductors are laminations, then flow 700 moves to 708. But if the magnetic flux conductors are wires, then flow 700 moves to 706. Magnetic powder is applied to the wires at 706 to fill the voids. In one embodiment, both the binding agent and the magnetic powder can be applied at the same time by transferring (e.g., by brushing) the combination of binding agent-magnetic powder onto the wires. At 708, a die is either heated or activated to apply pressure, or both, to cure the binding agent to form bar stock (e.g., metal bars). Alternatively, a heater can perform the curing process separate from the die. In some embodiments, a mating wheel at 708 heats and/or applies pressure to cure the binding agent to form the bar stock. At 710, the affixed magnetic flux conductors are cut to form field pole cores. That is, each of the plurality of magnetic flux conductors is cut at a length approximate to the length of the field pole core after affixing the plurality of magnetic flux conductors together to form affixed magnetic flux conductors. Then, flow 700 proceeds from 710 to 720, wherein 712, 714, 716 and 720 are similar in functionality as respective 612, 614, 616 and 620 of FIG. 6. Flow 700 can provide a cost-effective, constant cross-section process that continually forms field pole members. In one embodiment, flow 700 is similar to a pultrusion process. In some embodiments, flow 700 forms transitions regions with respect to the field pole members.

Figure 8A:
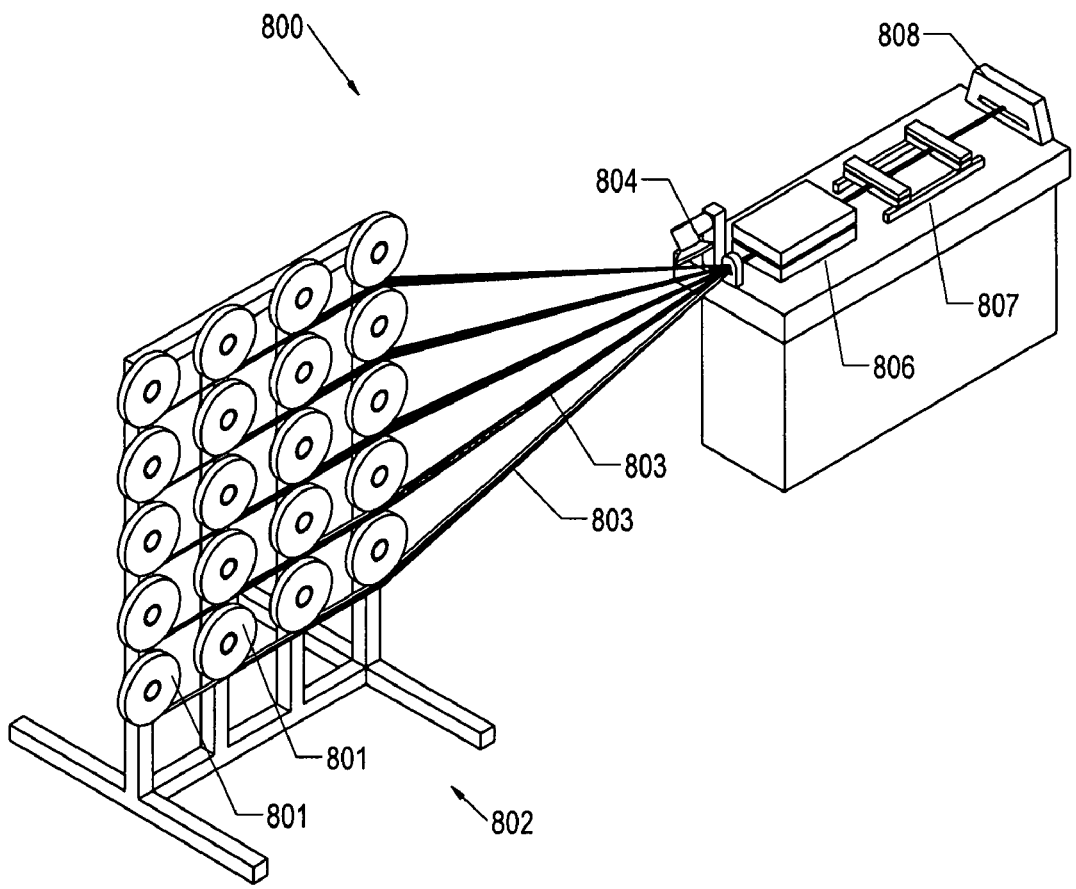
FIG. 8A illustrates a system for manufacturing a field pole member in accordance with an embodiment of the invention.

FIG. 8A illustrates a system for manufacturing a field pole member in accordance with an embodiment of the invention. System 800 includes a supply ("spooled laminations") 802, elongated magnetic flux conductors 803 (each of which is wound onto a spool 801), an optional spray-on binder 804, a combined die-heater 806, a pulling mechanism 807, and one or more cutters 808 for separating the affixed magnetic flux conductors from elongated magnetic flux conductors 803. Supply 802 includes a number of laminations arranged on spools. In one embodiment, each of elongated magnetic flux conductors 803 on respective spools has the same width. In an alternative embodiment, elongated magnetic flux conductors 803 can be of varying widths to, for example, produce tear drop-shaped field pole member cores. In some cases, sheet steel supplied by a steel mill is first slit to the various widths and re-spooled into supply 802 of FIG. 8A. Spools 801 are then loaded into the production machine. During processing, optional spray-on binder 804 sprays at least a heat-activated binding agent onto the individual elongated magnetic flux conductors 803 as they are pulled through a die 806. A heater stage of die 806 activates the binding agent, which solidifies the stack into bar stock. Pulling mechanism 807 pulls the affixed magnetic flux conductors into one or more cutters 808. For instance, two cutters 808 can be used in succession to create the final field pole cores. System 800 can reduce waste of material during the original slitting operation and possibly during the final cuts as compared to, for example, stamping laminations out of sheets of steel. Cutter 808 can form straight cuts (e.g., perpendicular to elongated magnetic flux conductors 803) or angled cuts. Water jet cutting is one example of cutter 808 suitable to practice some embodiments of the invention.

In some embodiments, wire having a grain orientation for enhancing magnetic properties can be used. The initial tooling costs for system 800 can be relatively low, and can be amortized over small volumes. The use of a binding agent to bind the magnetic flux conductors together can generally assist in reducing the noise and vibration of the final composite structure of a field pole member as compared to an equivalent structure made of, for example, unbonded steel laminations. In various embodiments, the laminations can also be affixed by laser welding, e-beam welding and the like.

Figure 14:
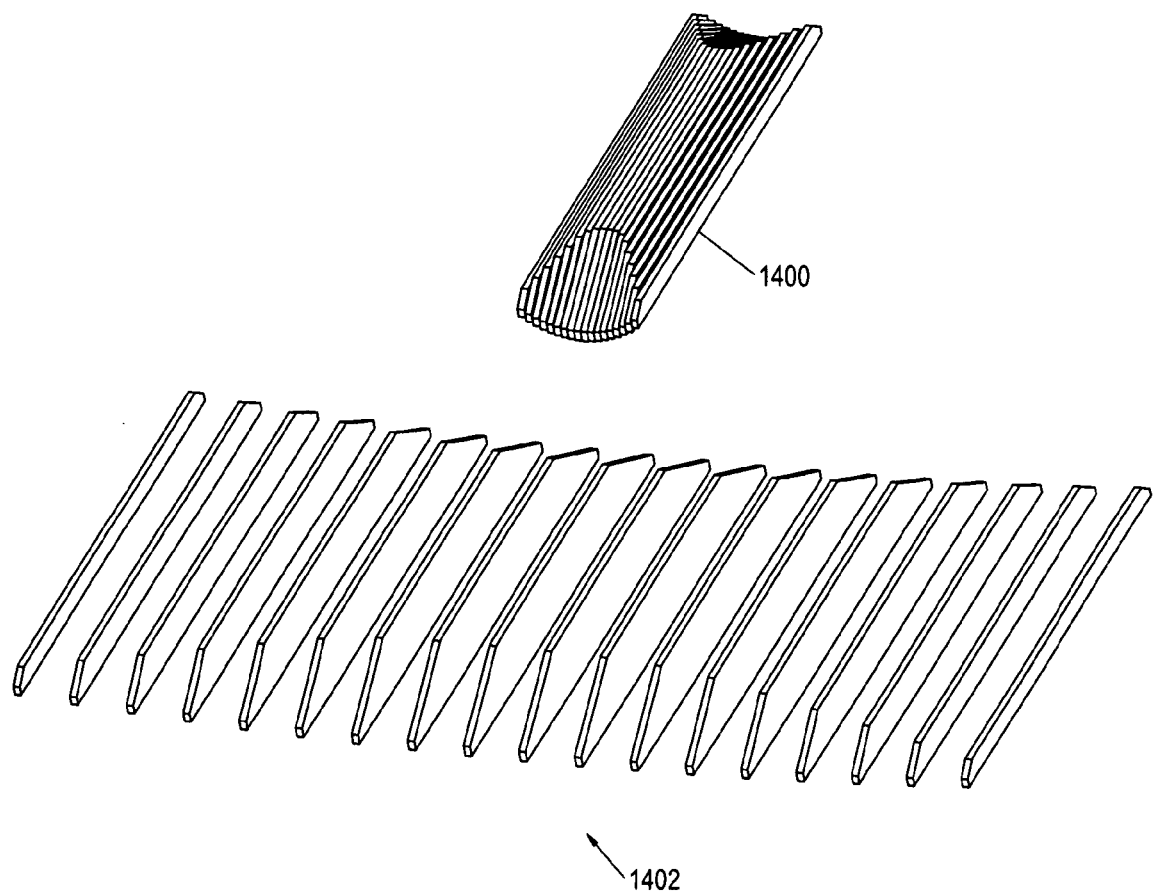
FIG. 14 illustrates a field pole member manufactured in accordance with yet another embodiment of the invention.
Figure 15:
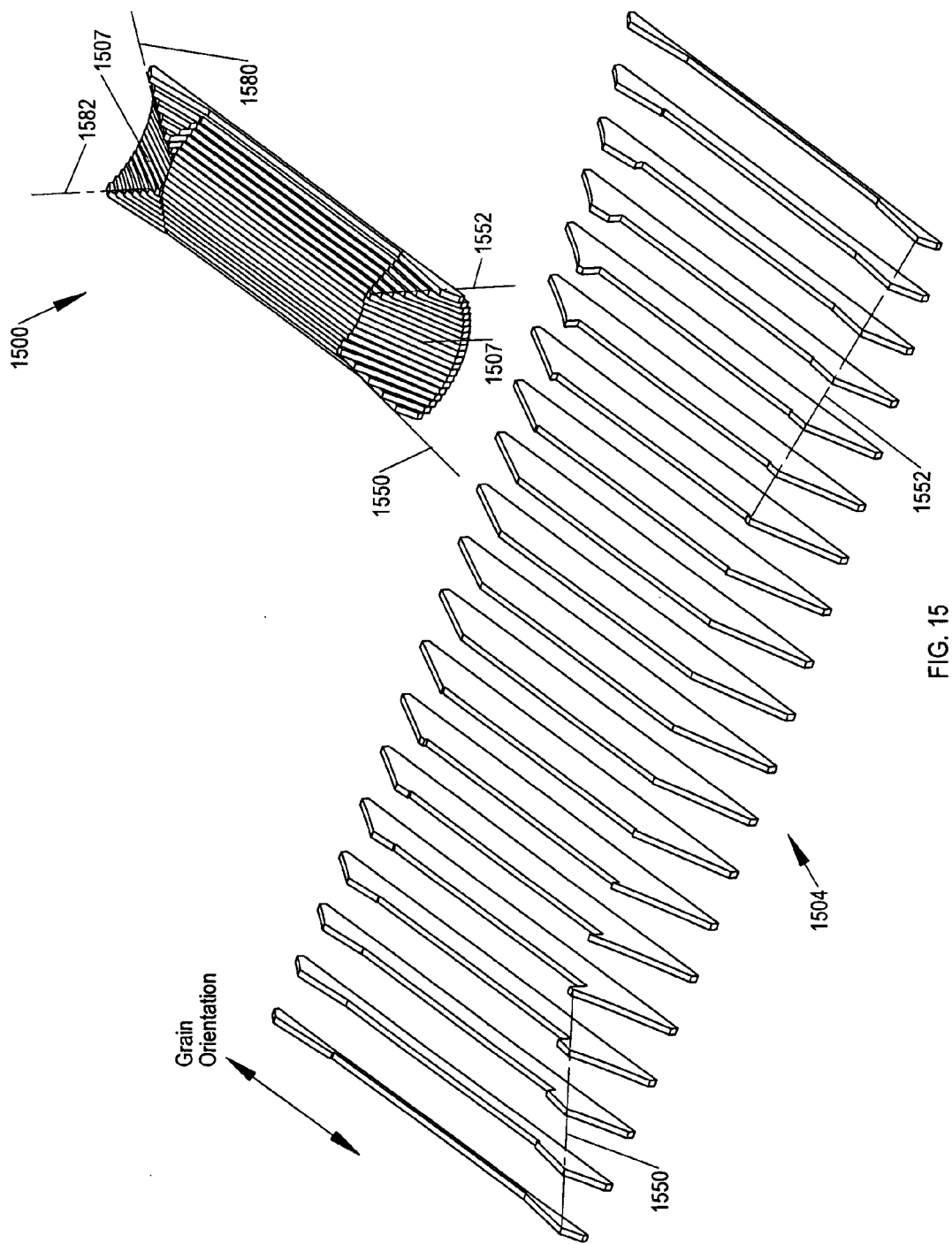
FIG. 15 illustrates a field pole member manufactured in accordance with still yet another embodiment of the invention.
Figure 16:
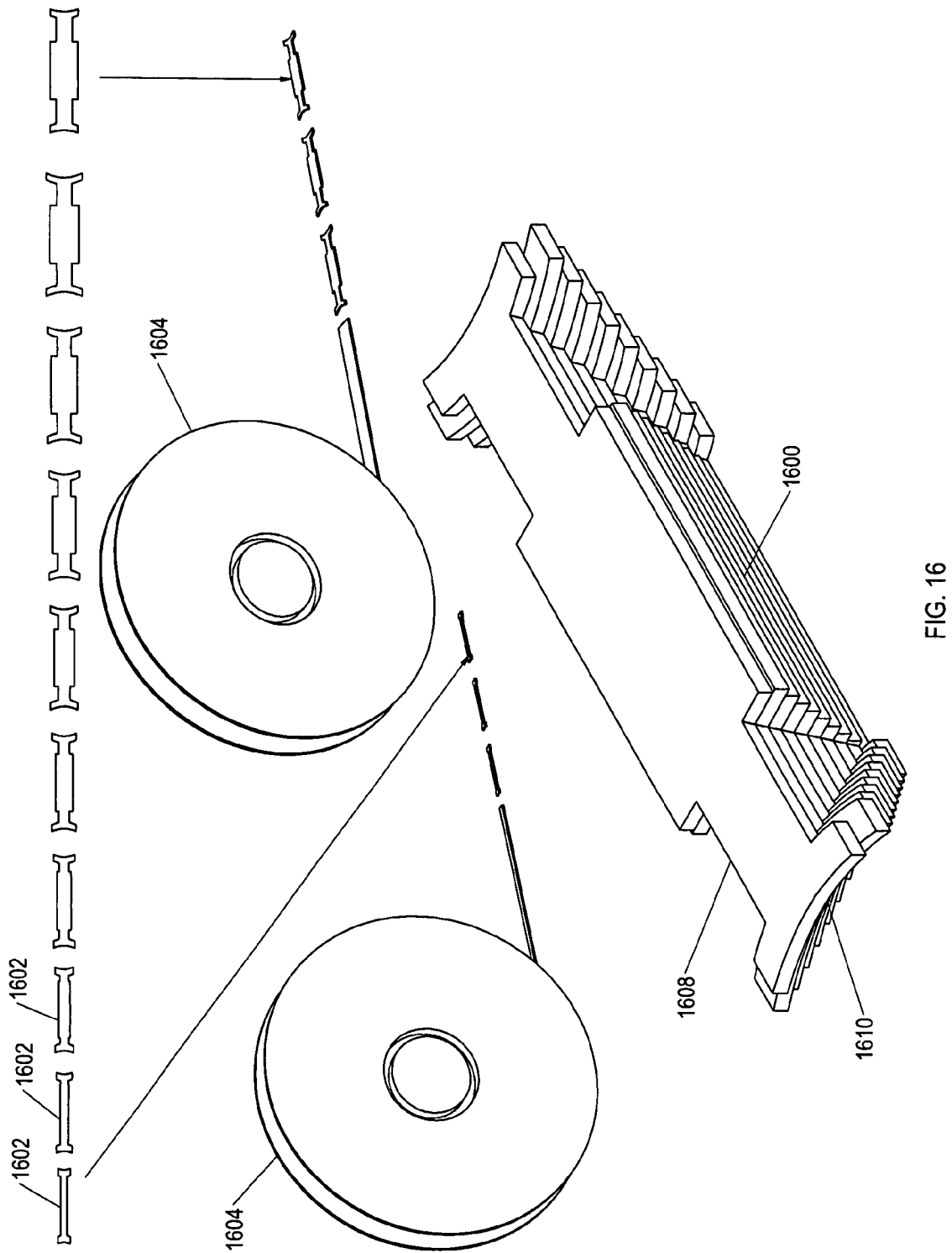
FIG. 16 illustrates a field pole member manufactured in accordance with at least one embodiment of the invention.

In some embodiments, magnetic flux conductors 803 can be formed as laminations using a stamping process. FIGS. 14 to 16 illustrate examples of laminations formed by, for example, stamping to produce field pole cores and/or field pole members. However, in reference to FIG. 8A, a slitting process can be used to longitudinally separate a starting material (or coil) into different widths for elongated magnetic flux conductors 803. Generally, laminations formed from a slitting process and a separation process, such as by cutting at cutters 808, are likely to have more favorable magnetic characteristics than those produced by stamping. Slitting processes suitable to practice some embodiments include standard shear wheel slitting, water jet slitting, and laser cutting. In some cases, the stamping process might disturb the magnetic properties of elongated magnetic flux conductors 803. In at least one embodiment, magnetic flux conductors 803 can be wires.

Figure 8B:
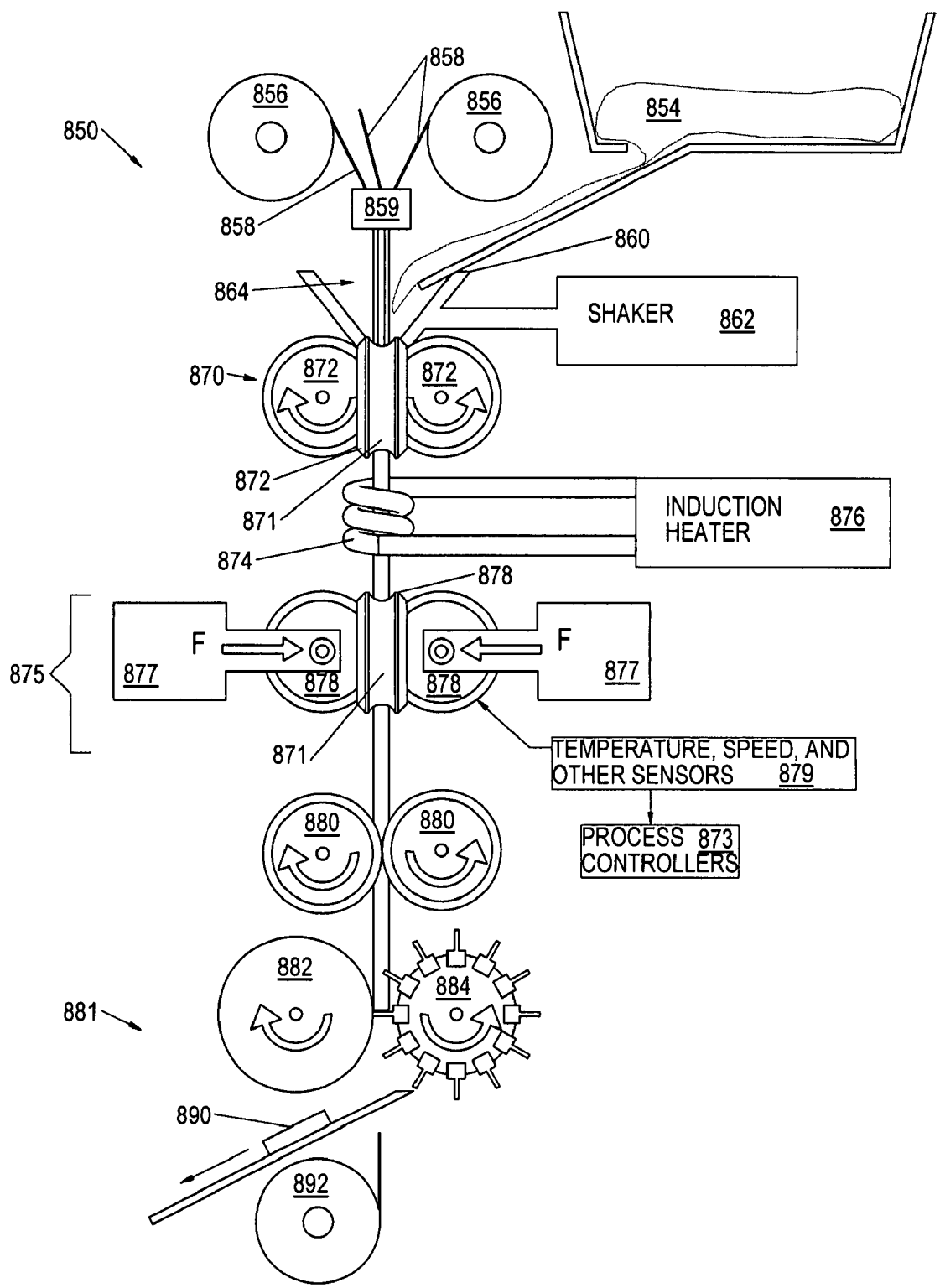
FIG. 8B illustrates another system for manufacturing a field pole member in accordance with another embodiment of the invention.

FIG. 8B illustrates another system for manufacturing a field pole member in accordance with another embodiment of the invention. System 850 can generally be used to form field pole cores as well as the field pole members themselves. As shown, system 850 is used to form field pole members and field pole cores formed by, for example, incorporating composite over elongated magnetic flux conductors, such as wires. Generally, wires 858 are fed via wire guide 859 from supply spools 856 into a hopper 860. Also, powered metal and/or SMC feed stock ("powder") 854 can be fed into hopper 860. In at least one embodiment, the size, the wire cross-section, and number of wires 858 can be selected as a function of, for example, process convenience and strength, rather than their magnetic properties. In various embodiments, the volume of wires 858 can vary in relation to the total volume of extrusion 899 or field pole cores 890 to achieve different properties. In one instance, the manufacturing process can be aligned vertically to allow gravity to aid the combination of materials in hopper 860 and to generally aid alignment of the extruded material while it moves through the system. System 850 can be aligned horizontally as well as in other variations of alignment.

Shaker 862 functions to vibrate the powder to combine it with magnetic wires 858 at incorporation site 864 within hopper 860. Shaker 862 is configured to shake hopper 860 to distribute powder 854 around wires 858, and to provide some initial densification of the mix as it enters an initial compaction site 864. In some embodiments, initial compaction wheels 872 are disposed adjacent hopper 860 to pass the combination of the wire and powder to a heating element. Generally, initial compaction wheels 872 can be started in synchronization with wires 858 take-up spool 892 to ensure constant wire tension—at least at start-up. The presence of the tensioned wires can eliminate a problem, at least in some instances, relating to extrusion processes (e.g., a problem of controlling the straightness of the extruded material).

In one embodiment, induction heater 876 heats extruded material 899 at induction heater coils 874, which are generally at temperatures of less than or about 500° C. System 850 also can include an additional (or final) compaction stage 875. In one embodiment, additional compaction stage 875 includes a number of additional compaction wheels 878 for further compacting the extrusion. In one example, hydraulic pistons 877 apply pressures via additional compaction wheels 878 (e.g., four wheels) to extruded material 899. Note that any number of additional compaction wheels 878 can be used. Further, additional compaction wheels 878 can be powered by motors to synchronize the speed of extrusion 899 passing through with the speed of the wire take up by take-up spool 892. Additional compaction wheels 878 can be adjacent to each other so that their angled or contoured surfaces 871 meet or almost meet. Angled or contoured surfaces 871 on wheels 872 and/or 878 can be configured to form the outside diameter portions of extrusion 899 to shape a portion of the field pole core/member, such as the cross-sectional area of a field pole core/member. Note that additional compaction wheels 878 can replace or supplement the use of the die 806 of FIG. 8A to aid in reducing the friction at the forming process. In some embodiments, temperature and speed sensors 879 and process controller 873 can control the functions of system 850, including the final compaction stage 875.

Powered tension wheels 880 can apply tension to extrusion 899, for example, once the wires are released at the bottom of the process at take-up spool 892. Extrusion 899 can be passed to the cutoff station 881 at which at least the field pole cores 890 are separated from extrusion 899. Cutoff station 881 can be energized to cut the extrusion into a predetermined length by, for example, blades 884, which can follow extrusion 899 at the same relative speed. Blades 884 can include moving saw blades. Once cutoff station 881 is energized, the wires that were fed to the take up spool 892 to provide initial tension are no longer needed.

Figure 9:
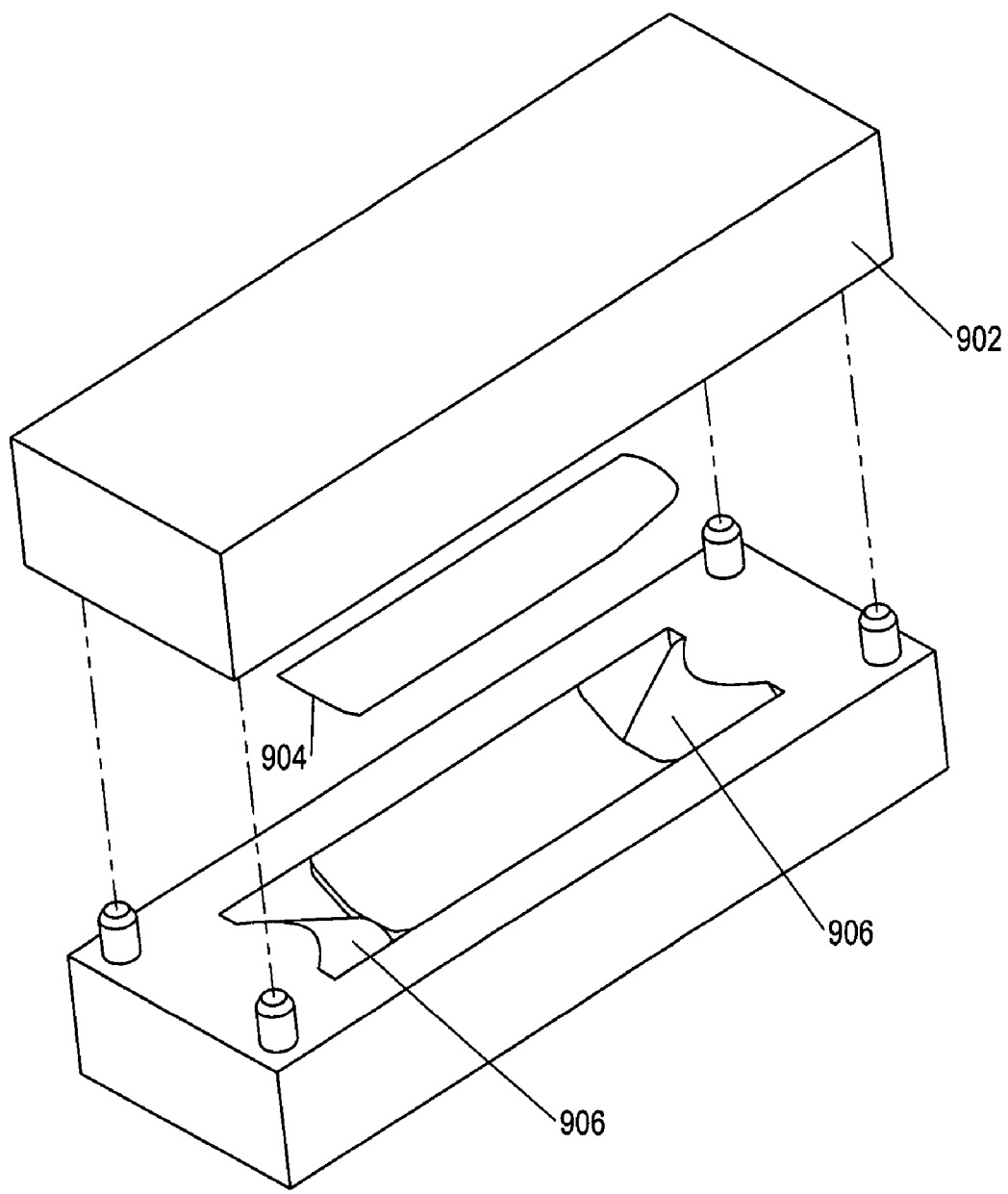
FIG. 9 illustrates an over-molding process to form pole faces in accordance with one embodiment of the invention.

FIG. 9 illustrates an over-molding process to form pole faces in accordance with one embodiment of the invention. Here, mold 902 includes two halves, one of which includes contours 906 for forming pole faces. In operation, a field pole core 904 is composed, for example, of laminations. Field pole core 904 then is deposited into mold 902. After the over-molding process, a field pole member is produced.

FIG. 10 illustrates an integrating process to form pole shoe faces in accordance with an embodiment of the invention. In FIG. 10, a field pole core 1012 has pole shoe members 1014 integrated or fastened thereto to form a field pole member 1010. Note that while field pole cores 1012 can be composed of laminations, as shown, FIG. 10, field pole core 1012 can be composed of any other magnetic flux conductor, including wires. In various embodiments, pole shoe members 1014 can include sculpted pole faces 1016, each of which can be either a contoured pole face or an angled pole face.

Figure 11A:
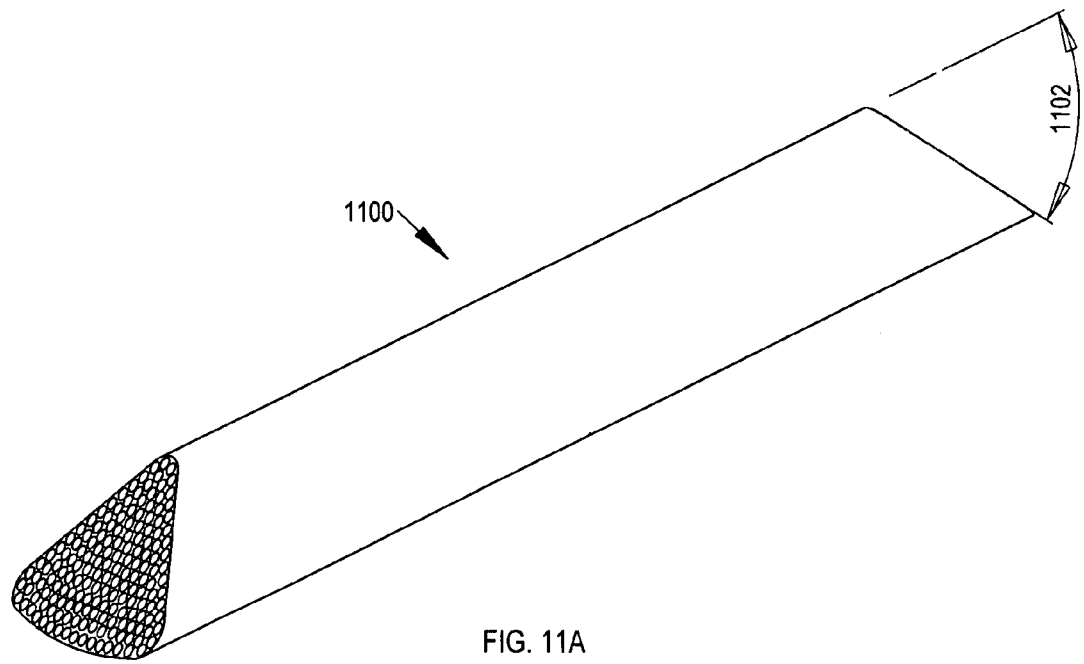
FIGS. 11A to 11C illustrate examples of field pole cores produced by embodiments of the invention.
Figure 11B:
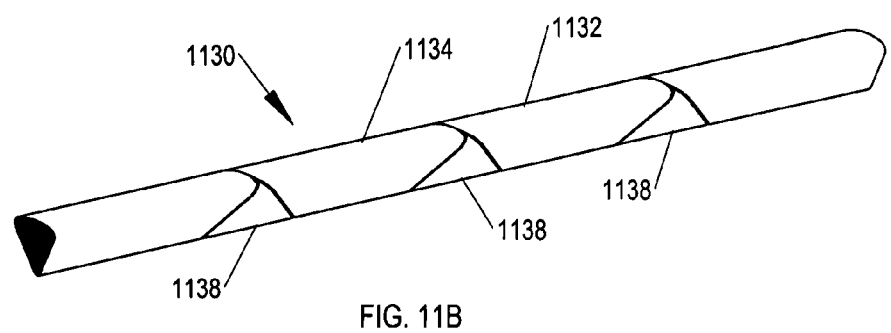
Figure 11C:
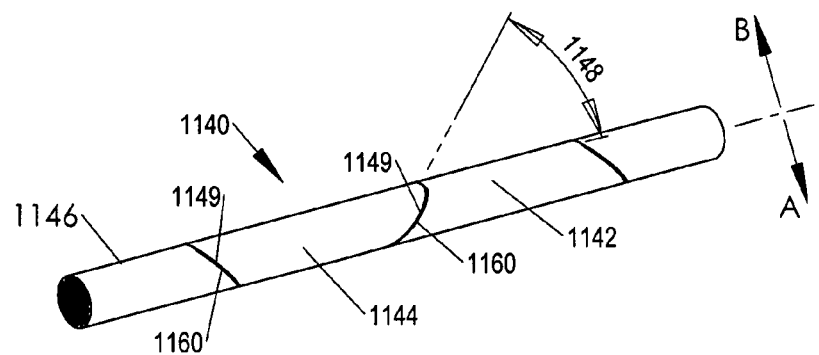

FIGS. 11A to 11C illustrate examples of field pole cores produced by various embodiments of the invention. As shown in FIG. 11A, cutting an elongated bar stock of affixed wires can produce field pole core 1100. The ends of field pole cores are shown to be cut at an angle 1102. Note too that cutting an elongated bar stock at angle 1102 produces at least two field pole cores 1100 having non-symmetrically shaped ends, as shown in FIG. 11B. To produce two consecutive field pole cores 1100 having symmetrically shaped ends, as shown in view 1130 of FIG. 11B, a notch 1138 is cut out to separate field pole cores 1132 and 1134. Notch 1138 represents wastage, and requires two cuts to separate the field pole cores 1132 and 1134 from each other. In one embodiment, the cross-section of the field pole core is such that it produces symmetrically-shaped ends, as shown in FIG. 11C. For example, consider view 1140 of FIG. 11C in which the field pole core has a circular cross-section. By producing symmetrically-shaped ends, a single cut can separate field pole cores 1142 and 1144, for example, rather than the two cuts of non-symmetrically shaped field pole cores that results in notch 1138 of FIG. 11B. As such, a single cut used to form field pole cores, and, thus, can reduce the wastage associated with notch 1138. Two single cuts—as shown in view 1140—can produce a field pole core 1144 having symmetrical cross-sections and ends 1149, both of which generally face direction "A." Those two single cuts also form symmetrically shaped ends 1160 for the other field pole cores 1142 and 1146, with those ends 1160 facing direction "B." Angle 1148 of the cut is generally configured to confront these surfaces of, for example, a conical magnet (not shown) being at a specific angle from an axis of rotation.

Figure 12:
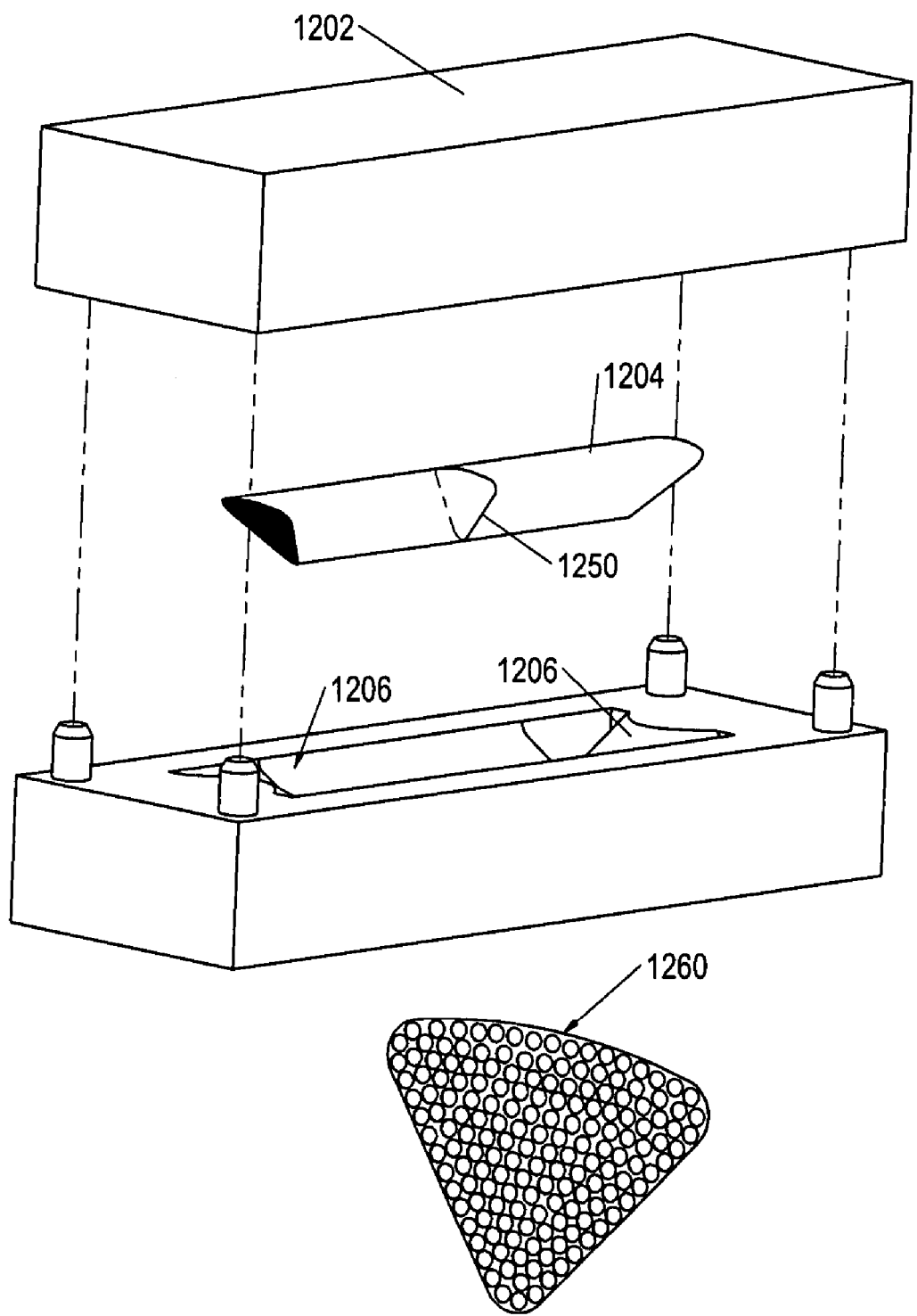
FIG. 12 illustrates an over-molding process to form pole faces in accordance with one embodiment of the invention.

FIG. 12 illustrates an over-molding process to form pole faces in accordance with one embodiment of the invention. Here, mold 1202 includes two halves, one of which includes contours 1206 on surface portions of mold 1202 for forming pole faces. Contours 1206 can be used to form contoured pole faces, such as contoured pole faces 1308 in FIG. 13. Referring back to FIG. 12, a field pole core 1204 can be composed, for example, of wires and can have cross-section 1250, which is shown to include wires in cross-section view 1260. Field pole core 1204 is deposited into mold 1202. After the over-molding process, a field pole member is produced. The parts out of the mold can have additional machining operations, if necessary, without shorting the wires together (provided the machining was accounted for in the design of the mold).

Figure 13:
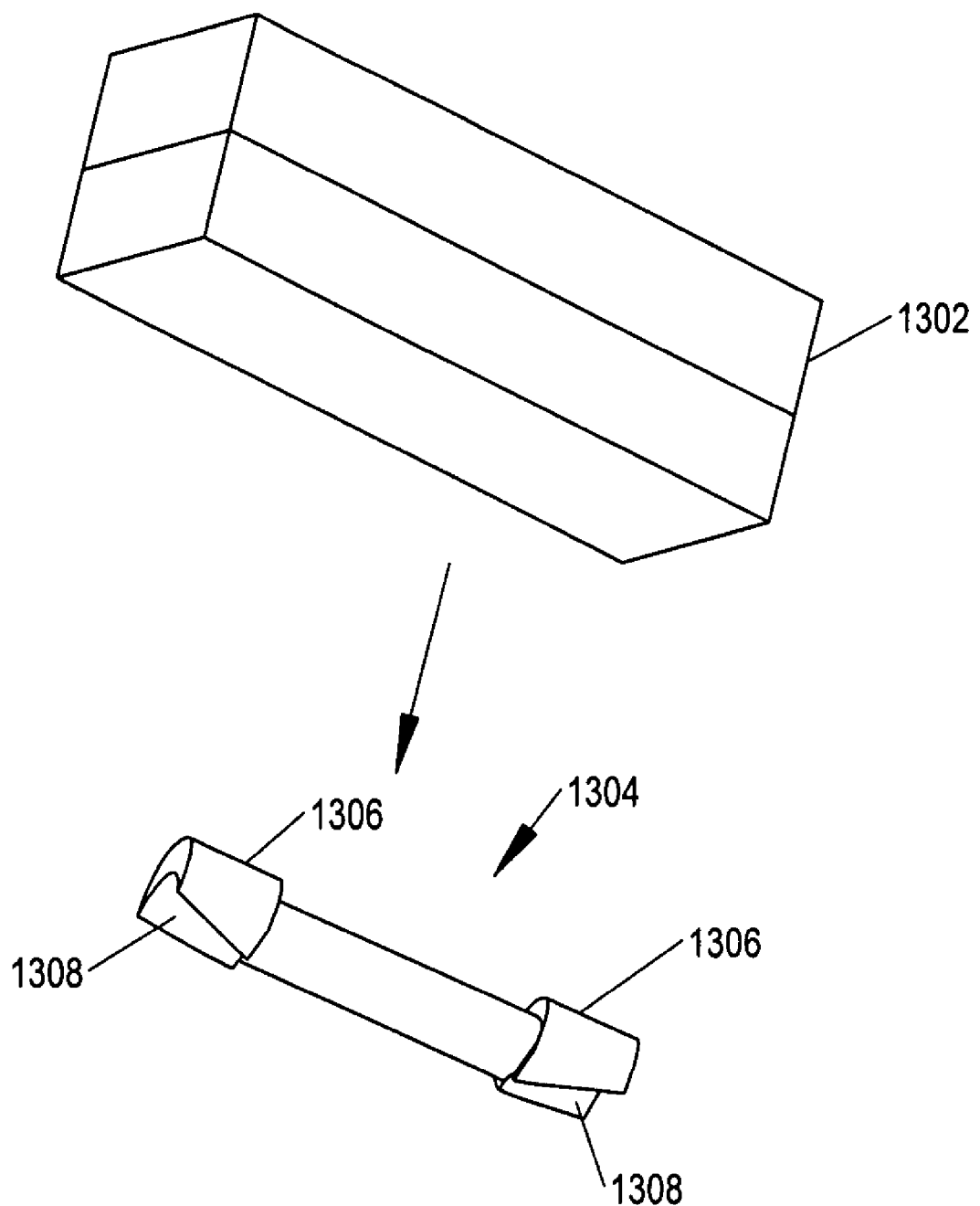
FIG. 13 illustrates a field pole member manufactured in accordance with an embodiment of the invention.

FIG. 13 illustrates a field pole member manufactured in accordance with an embodiment of the invention. In FIG. 13, mold 1302 produces a field pole member 1304, which creates two pole shoe members 1306 as well as pole faces 1308. In yet another embodiment, field pole member 1304 is composed of soft magnetic composite powder and is produced by inserting the powder into mold 1202 of FIG. 12 and then pressed into shape by mold 1302.

FIG. 14 illustrates a field pole member manufactured in accordance with yet another embodiment of the invention. In FIG. 14, laminations 1402 are stamped out of sheets of steel and affixed to each other to form field pole member 1400.

FIG. 15 illustrates a field pole member manufactured in accordance with still yet another embodiment of the invention. In FIG. 15, laminations 1504 are stamped out of sheets of steel and affixed to each other to form field pole member 1500 having sculpted pole faces 1507 having skewed field pole face edges to reduce detent and torque ripple. In particular, field pole member 1500 is constructed from a number of laminations 1504. Laminations 1504 can be patterned to provide sculpted pole faces 1507. Sculpted pole face 1507 is bound by both a first skewed edge 1550 and a second skewed edge 1552, whereas the other pole face 1507 at the other pole shoe is bound by a first skewed edge 1580 and a second skewed edge 1582.

In other embodiments, field pole members can implement wires as magnetic flux conductors to form field pole cores and/or members shown in FIGS. 14 to 16. As such, sculpted pole faces can be formed by, for example, a molding process as shown in FIG. 12. In some embodiments, a sculpted pole face can be referred to as a skewed pole face, especially if the pole face includes features as a function of detent and/or torque ripple.

FIG. 16 illustrates a field pole member manufactured in accordance with another embodiment of the invention. In FIG. 16, laminations 1602 are configured to aggregate together in a concentric orientation, or a substantially concentric orientation, in relation to an axis of rotation. In this example, different laminations 1602 can have different sizes, and can optionally include features, such as a pole shoe feature. To form field pole member 1600, laminations 1062 can be drawn from reels of pre-slit lamination material 1604 and assembled together. With this approach, scrap or waste material can be reduced, at least in some cases. Examples of the above-mentioned features include a stepped-back transition region 1608, which, for example, can reduce leakage between field pole cores/members once assembled. Stepped-back transition region 1608 can be formed in association with other features, such as part of a pole shoe, according to at least one embodiment. Another feature can form sculpted and/or skewed pole faces, such as shaped field pole face 1610.

A practitioner of ordinary skill in the art requires no additional explanation in making and using the embodiments of the rotor-stator structure described herein but may nevertheless find some helpful guidance by examining the following references in order from most to least preferred: "IEEE 100: The Authoritative Dictionary of IEEE Standard Terms," Institute of Electrical and Electronics Engineers (Kim Breitfelder and Don Messina, eds., 7th ed. 2000), "General Motor Terminology," as defined by the Small Motor and Motion Association ("SMMA"), and "Standard Specifications for Permanent Magnet Materials: Magnetic Materials Producers Association ("MMPA") Standard No. 0100-00," International Magnetics Association.

Embodiments of the invention can be implemented in numerous ways, including as a system, a process, an apparatus, or a series of program instructions on a computer readable medium such as a computer readable storage medium or a computer network where the program instructions are sent over optical or electronic communication links. In general, the steps of disclosed processes may be performed in an arbitrary order, unless otherwise provided in the claims.

The foregoing description, for purposes of explanation, used specific nomenclature to provide a thorough understanding of the various embodiments of the invention. However, it will be apparent to one skilled in the art that specific details are not required in order to practice embodiments of the invention. In fact, this description should not be read to limit any feature or aspect of the present invention to any embodiment; rather features and aspects of one embodiment can readily be interchanged with other embodiments.

Thus, the foregoing descriptions of specific embodiments of the invention are presented for purposes of illustration and description. They are not intended to be exhaustive or to limit the invention to the precise forms disclosed; many alternatives, modifications, equivalents, and variations are possible in view of the above teachings. For the purpose of clarity, technical material that is known in the technical fields related to the embodiments has not been described in detail to avoid unnecessarily obscuring the description. Thus, the various embodiments can be modified within the scope and equivalents of the appended claims.

Further, the embodiments were chosen and described in order to best explain the principles of the invention and its practical applications; they thereby enable others skilled in the art to best utilize the various embodiments with various modifications as are suited to the particular use contemplated. Notably, not every benefit described herein need be realized by each embodiment of the present invention; rather any specific embodiment can provide one or more of the advantages related to the various embodiments of the invention. In the claims, elements and/or operations do not imply any particular order of operation, unless explicitly stated in the claims. It is intended that the following claims and their equivalents define the scope of the invention.

The invention claimed is:

1. A field pole member formed in accordance with a method for constructing field pole members for electrodynamic machines, said method comprising:

positioning a plurality of magnetic flux conductors in proximity to each other to form at least a field pole core for a field pole member;

forming a first sculpted pole face at a first end of said field pole member having an elongated shape;

forming a second sculpted pole face at a second end of said field pole member having said elongated shape, said first sculpted pole face and said second sculpted pole face being disposed at opposite ends of said field pole member in an axial direction extending lengthwise along said elongated shape; and forming each of said first sculpted pole face and said second sculpted pole face to include at least a surface portion at an angle greater than 0° and less than 90° relative to a line parallel with an axis of rotation, wherein said first sculpted pole face and said second sculpted pole face are coextensive with a first curved surface portion of a first cone and a second curved surface portion of a second cone, said first curved surface portion and said second surface curved portion are positioned radially from said axis of rotation such that a straight line passes through said first curved surface portion and said curved second surface portion, said straight line being parallel to said axis of rotation, wherein each of said first curved surface portion and said second curved surface portion is uniform, wherein the first and the second curved surface portions are configured to establish a first uniform distance between said first curved surface portion and a first rotor surface and a second uniform distance between said second curved surface portion and a second rotor surface.

2. A field pole member for electrodynamic machines, the field pole member comprising:

a plurality of magnetic flux conductors forming at least a field pole core, the plurality of magnetic flux conductors including laminations;

a first sculpted pole face at a first end of said field pole member having an elongated shape, said field pole member including the field pole core; and a second sculpted pole face at a second end of said field pole member having said elongated shape, said first sculpted pole face and said second sculpted pole face being disposed at opposite ends of said field pole member in an axial direction extending lengthwise along said elongated shape, wherein each of said first sculpted pole face and said second sculpted pole face comprises a portion of a pole face that is substantially coextensive with an angle between 0° and 90° relative to a line parallel with an axis of rotation, wherein said first sculpted pole face and said second sculpted pole face are coextensive with a first curved surface portion of a first cone and a second curved surface portion of a second cone, said first curved surface portion and said second surface curved portion are positioned radially from said axis of rotation such that a straight line passes through said first curved surface portion and said curved second surface portion, said straight line being parallel to said axis of rotation, wherein each of said first curved surface portion and said second curved surface portion is uniform, wherein said first and said second curved surface portions are configured to establish a first uniform distance between said first curved surface portion and a first curved rotor surface and a second uniform distance between said second curved surface portion and a second curved rotor surface.

3. The field pole member of claim 2 wherein said field pole core comprises:

a substantially straight field pole core, wherein the substantially straight field pole core is configured to provide a substantially straight flux path between said first sculpted pole face and said second sculpted pole face.

4. The field pole Member of claim 2 wherein said plurality of magnetic flux conductors comprises:

isolated magnetic flux conductors.

5. The field pole member of claim 2 wherein said plurality of magnetic flux conductors comprises:

a plurality of wires.

6. The field pole member of claim 5 wherein the plurality of wires have cross-sections in the shape of a circle.

7. The field pole member of claim 5 wherein the plurality of wires have cross-sections in the shape of any of the following: a square, a hexagon and a diamond.

8. The field pole member of claim 2 further comprising:

a pole shoe member.

9. The field pole member of claim 8 wherein said pole shoe member comprises:

an over-molded cap.

10. The field pole member of claim 8 wherein said pole shoe member comprises:

an integrated cap.

11. The field pole member of claim 2 further comprising:

a subset of said plurality of magnetic flux conductors that are bounded by an envelope defining one or more surfaces of said field pole core, wherein said envelope has a cross-section shaped as a tear drop.

12. The field pole member of claim 2 further comprising:

a subset of said plurality of magnetic flux conductors that are bounded by an envelope defining one or more surfaces of said field pole core, wherein said envelope has a cross-section shaped as either a square, a circle, or an oval.

13. The field pole member of claim 2 wherein said first sculpted pole face comprises:

an angled pole face or a contoured pole face.

14. The field pole member of claim 2 wherein said first sculpted pole face further comprises:

a curved surface portion.

15. The field pole member of claim 2 wherein said first sculpted pole face further comprises:

a surface portion that is configured to confront a curved surface of a conical magnet to form an air gap between the surface portion and the curved surface of the conical magnet, wherein the air gap is oriented at an angle with the line parallel with the axis of rotation.

* * * * *